US005734903A

United States Patent [19]

Saulpaugh et al.

[11] Patent Number: 5,734,903
[45] Date of Patent: Mar. 31, 1998

[54] SYSTEM AND METHOD FOR OBJECT ORIENTED MESSAGE FILTERING

[75] Inventors: Thomas E. Saulpaugh, San Jose; Steven J. Szymanski, Cupertino, both of Calif.

[73] Assignee: Apple Computer, Inc., Cupertino, Calif.

[21] Appl. No.: 242,259

[22] Filed: May 13, 1994

[51] Int. Cl.$^6$ .................................................. G06F 13/00
[52] U.S. Cl. ............... 395/683; 395/185.02; 395/200.09; 395/200.15; 395/481
[58] Field of Search ................. 364/DIG. 1, DIG. 2; 395/683, 185.02, 200.09, 200.15, 481

[56] References Cited

U.S. PATENT DOCUMENTS

| | | | |
|---|---|---|---|
| 4,704,717 | 11/1987 | King, Jr. | 370/94 |
| 4,868,745 | 9/1989 | Patton et al. | 364/200 |
| 4,970,658 | 11/1990 | Durbin et al. | 364/513 |
| 5,305,461 | 4/1994 | Feigenbaum et al. | 395/775 |
| 5,315,709 | 5/1994 | Alston, Jr. et al. | 395/600 |
| 5,329,619 | 7/1994 | Page et al. | 395/200 |
| 5,339,418 | 8/1994 | East et al. | 395/650 |
| 5,377,350 | 12/1994 | Skinner | 395/600 |

FOREIGN PATENT DOCUMENTS 0463252  1/1992  European Pat. Off. .
0483036  4/1992  European Pat. Off. .

*Primary Examiner*—Lucien U. Toplu
*Attorney, Agent, or Firm*—Carr & Ferrell LLP

[57] ABSTRACT

A system for object oriented message filtering for selectively transferring a message between a client task and one or more server tasks for preprocessing, processing, and postprocessing comprises an object database having a filter object memory, an object management unit, a message transaction unit, and a locking unit. The object management unit creates a port object and one or more associated target message objects. The object management unit selectively creates one or more filter objects associated with a target message object, and selectively associates a preprocessor message object, a postprocessor message object, or both a preprocessor message object and a postprocessor message object with each filter object. The message transaction unit selectively routes a message sent by a client task and directed to a target message object to one or more associated preprocessor message objects prior to delivering the message to the target message object. After delivery to the target message object, the message transaction unit selectively routes the message to one or more associated postprocessor message objects. Server tasks receive messages from port objects associated with preprocessor message objects, target message objects, and postprocessor message objects, facilitating preprocessing, processing, and postprocessing operations.

19 Claims, 36 Drawing Sheets

| |
|---|
| MESSAGE OBJECT ID |
| MESSAGE OBJECT REFERENCE CONSTANT |
| REFERENCE TO PORT OBJECT |
| CLIENT TEAM ID |
| NEXT MESSAGE OBJECT ASSOCIATED WITH SAME PORT OBJECT |
| REFERENCE TO FILTER OBJECT |
| FILTER OBJECT ID |

| |
|---|
| NEXT AND PREVIOUS PORT OBJECTS |
| LIST OF MESSAGE OBJECTS |
| LIST OF LOCKED MESSAGE OBJECTS |
| PENDING SEND MESSAGE LIST |
| PENDING RECEIVE MESSAGE LIST |
| PENDING REPLY MESSAGE LIST |
| ACCEPTANCE FUNCTION INFORMATION |
| ASYNCHRONOUS SEND STORAGE |
| ASYNCHRONOUS RECEIVE STORAGE |
| PORT OBJECT ID |
| STATISTICAL INFORMATION |

| FILTER OBJECT ID |
|---|
| NEXT AND PREVIOUS FILTER OBJECTS |
| FILTER OBJECT NAME |
| MESSAGE TYPE LIST |
| FILTER OBJECT PLACEMENT ORDER |
| PREPROCESSOR MESSAGE OBJECT ID |
| POSTPROCESSOR MESSAGE OBJECT ID |
| TARGET MESSAGE OBJECT ID |
| INSTALLATION OPTIONS |

| |
|---|
| REFERENCE TO TARGET MESSAGE OBJECT |
| REFERENCE TO CURRENT FILTER OBJECT |
| REFERENCE TO CURRENT MESSAGE OBJECT |
| REFERENCE TO CURRENT PORT OBJECT |
| FILTER OBJECT STACK FROM FORWARD MESSAGE REQUESTS |
| NEXT AND PREVIOUS PENDING SEND MESSAGE LIST ENTRIES |
| CLIENT TASK ID |
| MESSAGE ADDRESS |
| MESSAGE LENGTH |
| MESSAGE TYPE |
| MESSAGE ID |
| SEND OPTIONS |
| MATCHING RECEIVE MCB |
| SERVER TASK ID |
| DELIVERY STATUS |
| MESSAGE OBJECT LOCK STATE |
| REPLY BUFFER ADDRESS |
| REPLY BUFFER SIZE |
| CLIENT TASK BLOCKING STATE |
| MAXIMUM TIME INTERVAL |

| |
|---|
| REFERENCE TO TARGET MESSAGE OBJECT |
| REFERENCE TO CURRENT FILTER OBJECT |
| REFERENCE TO CURRENT MESSAGE OBJECT |
| REFERENCE TO CURRENT PORT OBJECT |
| FILTER OBJECT STACK FROM FORWARD MESSAGE REQUESTS |
| NEXT AND PREVIOUS PENDING SEND MESSAGE LIST ENTRIES |
| CLIENT TASK ID |
| MESSAGE ADDRESS |
| MESSAGE LENGTH |
| MESSAGE TYPE |
| MESSAGE ID |
| SEND OPTIONS |
| MATCHING RECEIVE MCB |
| SERVER TASK ID |
| DELIVERY STATUS |
| MESSAGE OBJECT LOCK STATE |
| REPLY BUFFER ADDRESS |
| REPLY BUFFER SIZE |
| EVENT NOTIFICATION INFORMATION |

| |
|---|
| PORT OBJECT ID |
| NEXT AND PREVIOUS PENDING RECEIVE MESSAGE LIST ENTRIES |
| SERVER TASK ID |
| MESSAGE BUFFER ADDRESS |
| MESSAGE BUFFER SIZE |
| MESSAGE TYPE |
| MATCHING SEND MCB |
| MAXIMUM TIME INTERVAL |

| |
|---|
| PORT OBJECT ID |
| NEXT AND PREVIOUS PENDING RECEIVE MESSAGE LIST ENTRIES |
| SERVER TASK ID |
| MESSAGE BUFFER ADDRESS |
| MESSAGE BUFFER SIZE |
| MESSAGE TYPE |
| MATCHING SEND MCB |
| RECEIVE MESSAGE ID |
| EVENT NOTIFICATION INFORMATION |

SYSTEM AND METHOD FOR OBJECT ORIENTED MESSAGE FILTERING

CROSS-REFERENCE TO RELATED APPLICATIONS

The present invention relates to U.S. patent application Ser. No. 08/220,043, entitled "Object Oriented Message Passing System and Method," filed on Mar. 30, 1994, which is incorporated herein by reference.

BACKGROUND OF THE INVENTION

1. Field of the Invention

The present invention relates generally to systems and methods for intracomputer communication, and more particularly, to systems and methods for message-based client-server communication. Still more particularly, the present invention is a system and method for object oriented message filtering.

2. Description of the Background Art

In intra-computer communications, a client task requires a service provided by a server task. For example, a client task may require window creation or file deletion services. The particular service that the client task requires is performed by an appropriate server task, such as a window manager or a file system. A message is the unit of communication interchange between a client and a server. Thus, in order to inform a server that a particular service is required, the client task sends or issues an appropriate message. Upon receiving an issued message, the server task performs the required actions. As described in U.S. patent application Ser. No. 08/220,043, message passing systems and methods determine the manner in which a message that has been issued by a client task is delivered to a server task.

In the prior art, each time a client task requires a service, the client task must send a message. Often, the performance of a particular service requires the performance of one or more additional, related services. For example, the performance of a service that results in the writing of data to a disk file may also require a first related service for data encryption and a second related service for data compression. Thus, a total of three messages must be sent by a client task in this example to perform the desired encryption, compression, and writing of the data to the disk file. Each message sent increases the memory overhead required to deliver the message to an appropriate server task for processing. Moreover, each message must be sent and serviced in the proper order, and client tasks must keep track of all server tasks to which messages must be sent when the related services are required. Each of the aforementioned drawbacks adversely increases client task and server task complexity.

What is needed is a means for message transfer that minimizes memory overhead requirements and that isolates client tasks and server tasks from unnecessary complexity when multiple server tasks are to perform operations upon a message.

SUMMARY OF THE INVENTION

The present invention is a system and method for object oriented message filtering. In the present invention, a message sent by a client task is selectively and automatically transferred to one or more server tasks for preprocessing, processing, and postprocessing. The system of the present invention comprises a processing unit and a memory wherein an object oriented message filtering unit resides. The object oriented message filtering unit creates and maintains one or more port objects and one or more target message objects. For each target message object, the object oriented message filtering unit selectively creates and maintains one or more associated filter objects. The set of filter objects that are associated with a particular target message object are referred to as a filter object chain. For each filter object, the object oriented message filtering unit selectively creates and maintains an associated preprocessor message object, an associated postprocessor message object, or both an associated preprocessor message object and an associated postprocessor message object. Each target message object, preprocessor message object, and postprocessor message object is associated with a port object.

A client task sends a message directed to a target message object by issuing a send message request. The message referenced in the send message request itself indicates a required service. In response to a send message request, the object oriented message filtering unit creates a send message control block (MCB) that includes a unique message ID and a reference to the message. The object oriented message filtering unit delivers a message to a particular message object by storing a reference to the send MCB in the port object associated with the message object. Prior to delivering the send MCB to the target message object, the object oriented message filtering unit automatically and selectively routes the send MCB to preprocessor message objects associated with the target message object via the target message object's filter object chain. After delivering the message to the target message object, the object oriented message filtering unit automatically selectively routes the send MCB to postprocessor message objects associated with the target message object via the filter object chain.

Server tasks receive messages from a port object by issuing a receive message request that includes a reference to the port object. After a server task receives a message, the server task performs a service corresponding to the particular message object to which the message had been delivered. The object oriented message filtering unit matches each send MCB with a receive message request. Because each preprocessor message object, target message object, and postprocessor message object is associated with a port object, the selective delivery of the send MCB to one or more preprocessor message objects facilitates message preprocessing services that may be required before the service associated with the target message object is performed. In a like manner, the selective delivery of the send MCB to one or more postprocessor message objects facilitates message postprocessing services that may be required after the service associated with the target message object is performed.

After a server task has performed a given service, the server task can issue a continue message request, a forward message request, or a reply. In the present invention, the transfer or rerouting of the send MCB to one or more preprocessor message objects associated with the target message object via the filter object chain is referred to as "continuing" the message during preprocessing. In a like manner, the transferal or rerouting of the send MCB to one or more postprocessor message objects associated with the target message object via the filter object chain is referred to as continuing the message during postprocessing. The object oriented message filtering unit continues a message by performing continue message operations, in accordance with preprocessing or postprocessing, in response to a continue message request. The object oriented message filtering unit also "forwards" the send MCB to a new target message object by performing message forward operations in response to a forward message request.

In response to a reply issued after a server task's performance of a service associated with a preprocessor message object, the object oriented message filtering unit routes the send MCB to a postprocessor message object associated with the preprocessor message object in a "skip-ahead" operation. In response to a reply issued after a server task's performance of a service associated with the target message object, the object oriented message filtering unit selectively routes the send MCB to postprocessor message objects associated with the target message object via the filter object chain. In response to a reply issued after all postprocessing has been considered, the object oriented message filtering unit delivers a reply status and possibly data to the client task that originally sent the message.

The method of the invention comprises the steps of: creating a port object; creating a target message object associated with the port object; creating a filter object associated with the target message object; creating a preprocessor message object associated with the filter object; generating a unique message ID in response to a message transaction initiated by a send message request; creating a send message control block; and selectively routing the send message control block to the preprocessor message object prior to delivering the send message control block to the target message object.

In the present invention, a client task issues a single send message request regardless of whether preprocessing or postprocessing services are required in addition to the service associated with the target message object.

BRIEF DESCRIPTION OF THE DRAWINGS

FIG. 4 is a block diagram of a message object in the present invention;

FIG. 5 is a block diagram of a port object in the present invention;

FIG. 6 is a block diagram of a filter object in the present invention;

FIG. 7A is a block diagram of a synchronous send message control block in the present invention;

FIG. 7B is a block diagram of an asynchronous send message control block in the present invention;

FIG. 8A is a block diagram of a synchronous receive message control block in the present invention;

FIG. 8B is a block diagram of an asynchronous receive message control block in the present invention;

DETAILED DESCRIPTION OF THE PREFERRED EMBODIMENTS

Figure 1:
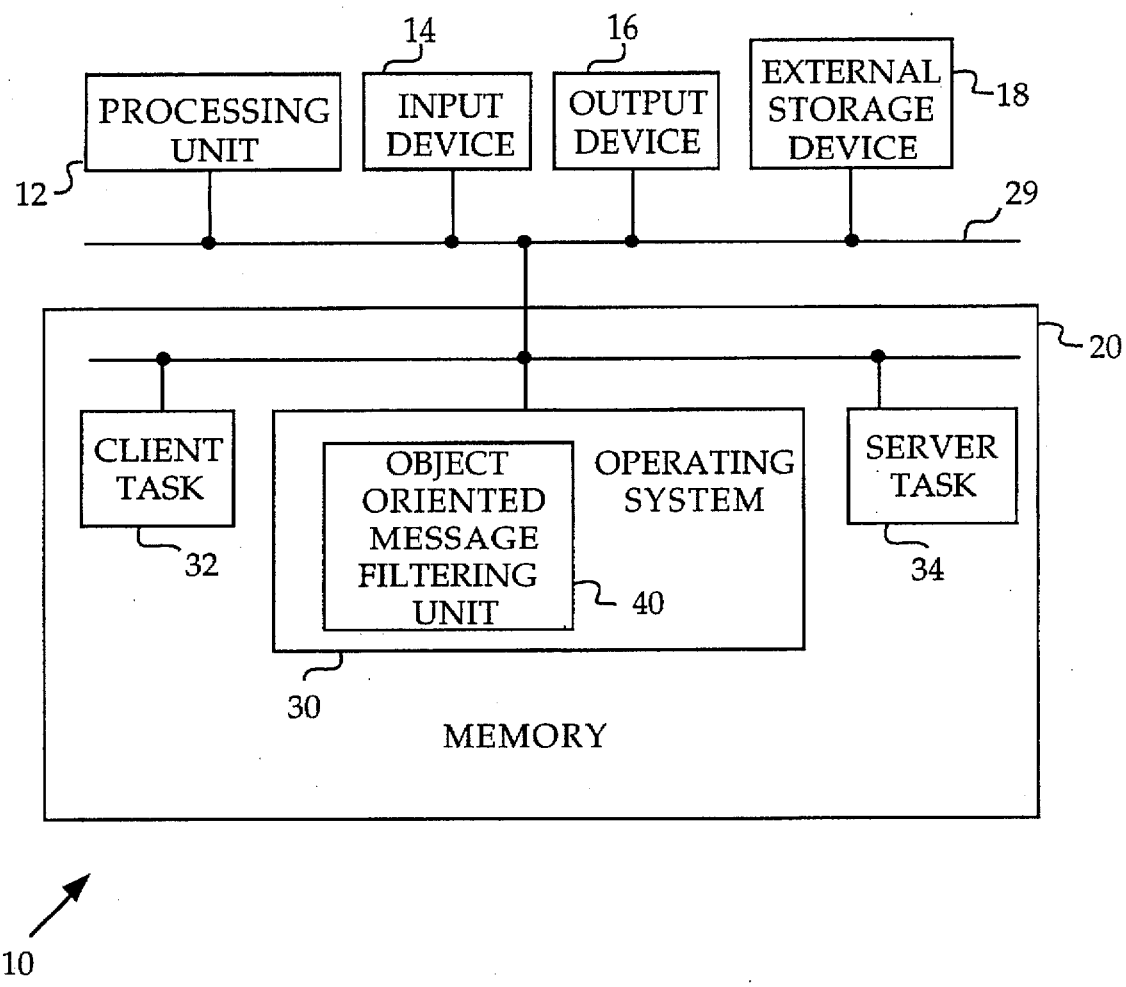
FIG. 1 a block diagram of a preferred embodiment of system for object oriented message filtering constructed in accordance with the present invention.

Referring now to FIG. 1, a block diagram of a preferred embodiment of a system 10 for object oriented message filtering constructed in accordance with the present invention is shown. The system 10 comprises a processing unit 12, an input device 14, an output device 16, a predetermined amount of memory 18 wherein an operating system 30, a client task 32, and a server task 34 reside. Preferably, the operating system 30 is a microkernel operating system 30 as described in U.S. patent application Ser. No. 08/220,043. An object oriented message filtering unit 40 resides within the operating system 30. Each element of the system 10 has an input and an output coupled to a common system bus 29. In an exemplary embodiment, the system 10 of the present invention is an Apple Macintosh computer system made by Apple Computer, Inc., of Cupertino, Calif., and having a Motorola MC68030 or later-generation microprocessor and 8 Mbytes of Random Access Memory (RAM) wherein a microkernel operating system 30 that inches the object oriented message filtering unit 40 resides.

In the present invention, a client task 32 is preferably a set of program instructions that requires a given service, for example, the transfer of data from the external storage device 18 into the memory 20. The provider of a given service is referred to herein as a server task 34. Preferably, each server task 34 is also a set of program instructions.

Figure 2:
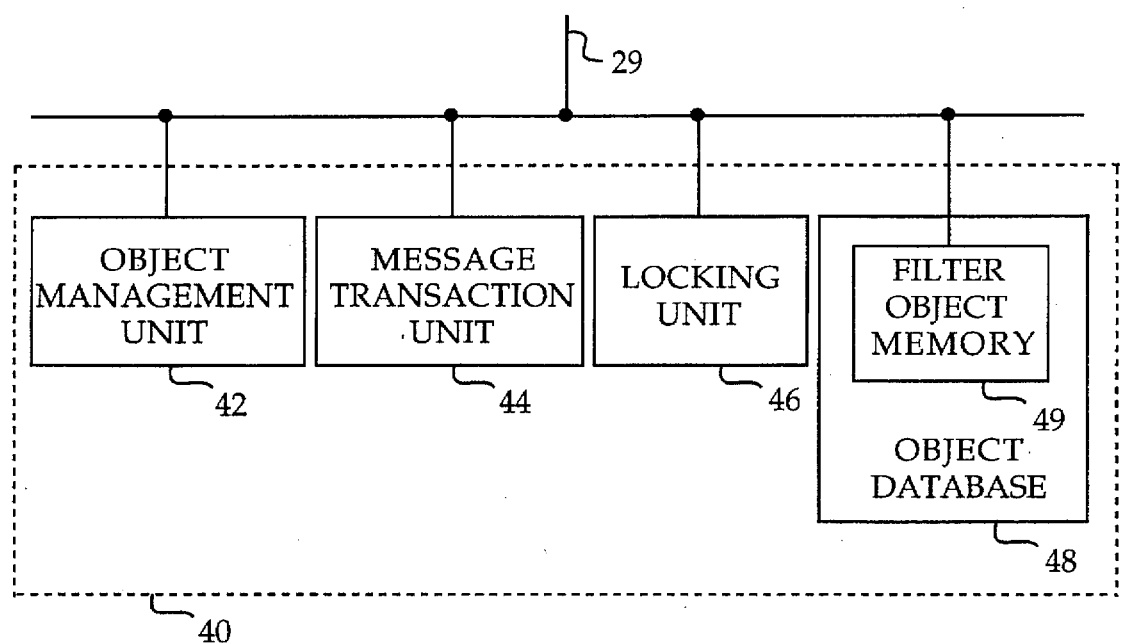
FIG. 2 is a block diagram of an object oriented message filtering unit of the present invention.

The object oriented message filtering unit 40 facilitates the transfer of a message from a client task 32 to one or more server tasks 34 for processing. Referring now to FIG. 2, a block diagram of a preferred embodiment of the object oriented message filtering unit 40 is shown. The object oriented message filtering unit 40 comprises an object management unit 42, a message transaction unit 44, a locking unit 46, and an object database 48 wherein a filter object memory 49 resides. Each element of the object oriented message filtering unit 40 has an input and an output coupled to the common system bus 29.

Figure 3:
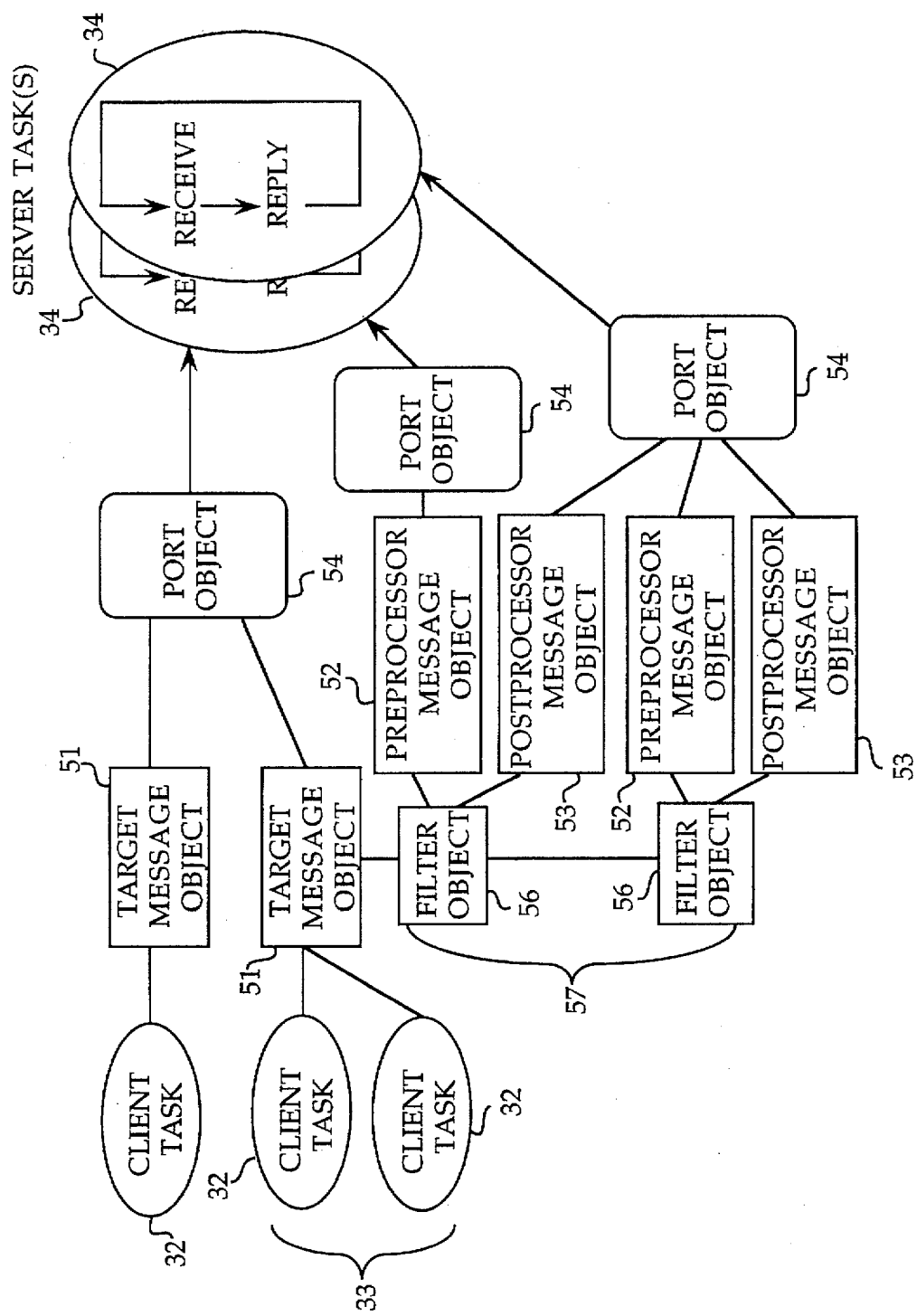
FIG. 3 is a block diagram of a preferred object oriented message filtering model provided by the present invention.

The object management unit 42 creates and maintains a set of objects or data structures in the memory 20 that provide an object oriented message filtering model 50. Referring now to FIG. 3, a block diagram of a preferred object oriented message filtering model 50 is shown. In the preferred object oriented message filtering model 50, one or more target message objects 51 are present. Each target message object 51 preferably corresponds to a particular service provided by a server task 34. To invoke the behavior associated with a given target message object 51, a client task 32 sends a message to the target message object 51 by issuing a send message request, where the send message request specifies the target message object 51, a message, and a message type. The send message requests will be described in more detail below. A set of client tasks 32 associated with a given target message object 51 is referred to herein as a client team 33.

One or more filter objects 56 may be associated with a particular target message object 51. When a target message object 51 has an associated filter object 56, the target message object 51 is referred to herein as being filtered. The set of filter objects 56 associated with a given target message object 51 is referred to herein as a filter object chain 57. Each filter object 56 represents a selective message interception means, where selectivity is preferably indicated according to a set of message types. Associated with each filter object 56 is either a preprocessor message object 52, a postprocessor message object 53, or both a preprocessor message object 52 and a postprocessor message object 53. A preprocessor message object 52 represents a particular service that is to be performed prior to a server task's performance of the service associated with the target message object 51. Similarly, a postprocessor message object 53 represents a particular service that is to be performed after a server task's performance of the service associated with the target message object 51. In the preferred embodiment, preprocessor message objects 52 and postprocessor message objects 53 may themselves be filtered.

In the preferred message filtering model 50, each target message object 51, each preprocessor message object 52, and each postprocessor message object 53 is associated with a port object 54. As shown in FIG. 3, a preprocessor message object 52 and a postprocessor message object 53 need not be associated with the same port object 54. That is, each preprocessor message object 52 and each postprocessor message object 53 can be independently associated with a particular port object 54. Each port object 54 serves as a receptacle for messages directed to each target, preprocessor, and postprocessor message objects 51, 52, 53 that are associated with the port object 54. Server tasks 34 receive messages from a port object 54 by issuing receive message requests as will be described in more detail below. After receiving a given message, a server task 34 implements the service represented by the target, preprocessor, or postprocessor message object 51, 52, 53 to which the message was directed, according to details supplied in the message itself.

In the object oriented message filtering model 50, a client task 32 issues a send message request to a particular target message object 51. If no filter object 56 is associated with the target message object 51, messages are transferred from the client task 32 to a server task 34 as described in U.S. patent application Ser. No. 08/220,043. When the target message object 51 has an associated filter object 56, the present invention determines whether the first filter object 56 in the target message object's filter object chain 57 has an associated preprocessor message object 52 and whether the message type specified in the send message request falls within the set of message types associated with the first filter object 56. If a preprocessor message object 52 is associated with the first filter object 56 and the message types match, the present invention reroutes the message to the preprocessor message object 52 for preprocessing. If the first filter object 56 does not have an associated preprocessor message object 53, or if the message types do not match, the present invention sequentially selects and examines each filter object 56 in the filter object chain 57 in the manner described above.

When a message has been rerouted to a preprocessor message object 52, a server task 34 will perform the service associated with the preprocessor message object 52. After performing the service associated with a preprocessor message object 52, the present invention either: 1) sequentially selects and examines a next filter object 56 in the target message object's filter object chain 57 in the manner described above in the event that the server task 34 issues a message continuation request and another filter object 56 is present in the filter object chain 57; 2) routes the message to the target message object 51 for processing in the event that the server task 34 issues a message continuation request and no other filter objects 56 are present in the filter object chain 57; 3) reroutes the message to a new target message object 51 for processing in the event that the server task 34 issues a message forward request specifying a new target message object 51; or 4) reroutes the message to a corresponding postprocessor message object 53 for postprocessing in the event that the server task 34 issues a reply.

When the message has been received at the target message object 51, a server task 34 will perform the service associated with the target message object 51. Following the server task's performance of the service associated with the target message object 51, the present invention determines whether the last filter object 56 in the filter object chain 57 has an associated postprocessor message object 53 and whether the message type specified in the send message request falls within the set of message types associated with the last filter object 56. If a postprocessor message object 53 is associated with the last filter object 56 and the message types match, the present invention reroutes the message to the postprocessor message object 53 for postprocessing. If no postprocessor message object 53 is present, or if the message types do not match, the present invention sequentially selects and examines the previous filter object 56 in the filter object chain 57 in the manner described above.

In a manner analogous to that for a preprocessor message object 52, a server task 34 will perform the service associated with a postprocessor message object 53 when the message has been rerouted to the postprocessor message object 53. After performing the service associated with the postprocessor message object 53, the present invention sequentially selects and examines each remaining previous filter object 56 in the filter object chain 57 according to the presence of a postprocessor message object 53 and according to matching message types, in the manner described above.

Those skilled in the art will recognize that a filter object chain 57 is traversed in a "forward" direction toward the last filter object 56 when preprocessor message objects 52 are under examination, and that the filter object chain 57 is traversed in a "backward" direction toward the first filter object 56 when postprocessor message objects 53 are under examination.

When a message has been rerouted to a new target message object 51 as a result of a server task's issuance of a forward message request, the present invention preferably examines each filter object 56 in the new target message object's filter object chain 57, first in view of preprocessing and then in view of postprocessing, in the manner described above for the original target message object 51. After examining each filter object 56 in the new target message object's filter object chain 57 in view of postprocessing, the present invention examines each filter object 56 in the original target message object's filter object chain 57 in view of postprocessing.

After all filter objects 56 in the original target message object's filter object chain 57 have been examined in view of postprocessing, the present invention issues a reply to client task 32 that originally sent the message. Herein, the reply that is issued after all filter objects 56 have been examined in view of postprocessing is referred to as a final reply. The final reply provides the client task 32 with status information and possibly data. Additional material describing the object oriented message filtering model 50 is provided in Appendix A.

The sending of a given message by a client task 32, followed by transfer of the message to one or more preprocessor message objects 52, target message objects 51, and postprocessor message objects 53, followed by the issuance of the final reply to the message is referred to herein as a message transaction. Each of the operations performed during a message transaction will be described in greater detail below.

In the preferred embodiment, target message objects 51, preprocessor message objects 52, and postprocessor message objects 53 are implemented with an identical structure, which is referred to herein as a message object 58. Those skilled in the art will recognize that in an alternate embodiment, target message objects 51, preprocessor message objects 52, and postprocessor message objects 53 could each have their own distinct structure. Referring now to FIG. 4, a block diagram of a preferred embodiment of a message object 58 is shown. Each message object 58 is preferably stored in the object database 48. The object management unit 42 creates a message object 58 and generates a unique message object identification (ID) in response to a server task's issuance of a message object creation request. The message object creation request preferably includes a reference constant specifying an initial state of the message object 58; a reference to a given port object 54 with which the message object 58 is to be associated; and a client team ID specifying a set of client tasks 32 with which the message object 58 is to be associated. Additionally, if the message object 58 is to be filtered, the message object creation request preferably specifies a reference to a first filter object 56 in a filter object chain 57. If the message object 58 is to be used as a preprocessor message object 52 or as a postprocessor message object 53, the message object creation request also specifies a unique filter object ID that identifies the filter object 56 with which the preprocessor or postprocessor message object 52, 53 is associated.

Within each message object 58, a first data field stores the message object ID generated by the object management unit 42 that uniquely identifies the message object 58; a second data field stores the reference constant supplied by the server task 34, where the reference constant corresponds to the initial state of the message object 58; a third data field references the given port object 54 indicated in the message object creation request; a fourth data field specifies the client team ID 33 included in the message object creation request; and a fifth data field references a next message object 58 associated with the given port object 54. The object management unit 42 does not assign a value to the fifth data field until a next message object 58 has been created. If the message object creation request specifies a reference to a first filter object 56 in a filter object chain 57 associated with the message object 58, a sixth data field stores the reference to the specified filter object 56. In the event that the message object creation request specified a filter object ID, a seventh data field stores the specified filter object ID corresponding to the filter object 56 with which the message object 58 is associated. In the preferred embodiment, the sixth and seventh data fields in the message object 58 are initially set to a nil value. The sixth data field in the message object 58 is initialized and updated upon filter object installation and removal. Filter object installation and removal will be described in detail below. If the message object 58 is a target message object 51, the sixth data field stores a pointer to the associated filter chain 57. When the target message object 51 is first created, the sixth data field is assigned a nil value because no filter objects 56 have been installed upon the target message object 51 yet.

The filter object ID stored in the seventh data field of the message object 58 is used only by preprocessor and postprocessor message objects 52, 53. The seventh data field is initialized when the message object 58 is designated as a preprocessor message object 52 or as a postprocessor message object 53 during a filter object installation.

Referring now to FIG. 5, a block diagram of a preferred embodiment of a port object 54 is shown. The object management unit 42 creates a port object 54 and generates a unique port object ID in response to a port object creation request from a server task 34. In the port object 54, a first data field specifies a next port object and a previous port object. The object management unit 42 therefore links port objects 52 together via their respective first data fields. A second data field in the port object 54 provides a list of those message objects 52 that are associated with the port object 54. When the object management unit 42 creates a new message object 58, the object management unit 42 adds the corresponding new message object ID to the list in the second data field of the port object 54 with which the newly created message object 58 is associated. A third data field in the port object 54 provides a list of each associated message object 58 that has been "locked" in response to a lock request. When a given message object 58 is locked, any messages directed to the given message object 58 are not available to be received by a server task 34 until unlocking operations have been performed. Message object locking and unlocking operations are performed by the locking unit 46 and will be described in detail below.

In the port object 54, a fourth data field is used to store a pending send message list that specifies those messages that have been directed to a message object 58 associated with the port object 54, but that have not yet been received by a server task 34. A fifth data field in the port object 54 is used to store a pending receive message list that specifies those receive message requests that have been issued to the port object 54 by server tasks 34, but that have not yet been matched to a corresponding message directed to a message object 58 associated with the port object 54. A sixth data field in the port object 54 is used to store a pending reply message list that specifies each message that server tasks 34 have received but for which a final reply has not yet been issued. When the object management unit 42 creates the port object 54, the fourth, fifth, and sixth data fields are empty. As will be described below, the lists stored in the fourth, fifth, and sixth data fields are maintained by the message transaction unit 44.

A seventh data field in the port object 54 optionally specifies an acceptance function and a set of message types associated with the acceptance function. Acceptance functions are described in detail in U.S. patent application Ser. No. 08/220,043. Preferably, the seventh data field is empty when the object management unit 42 first creates the port object 54. The object management unit 42 stores or registers a reference to an acceptance function and the set of message types in response to a server task registration request that identifies a particular acceptance function and the set of message types.

In the preferred embodiment, client tasks 32 can send messages synchronously or asynchronously. In a like manner, server tasks can issue receive message requests synchronously or asynchronously. Synchronous and asynchronous operations will be described in more detail below. An eighth data field in the port object 54 specifies an amount of storage available for messages sent asynchronously, and a ninth data field in the port object 54 specifies an amount of storage available for asynchronous message receive requests.

A tenth data field in the port object 54 is used to store the unique port object ID generated by the object management unit 42. Finally, an eleventh data field in the port object 54 is used to store statistical information such as the total number of messages sent to message objects 52 associated with the port object 54 since the port object's creation. In the preferred embodiment, each message object 58 is associated with a particular port object 54. Therefore, a port object 54 must be created in the preferred embodiment before a corresponding message object 58 is created.

The object management unit 42 creates a new filter object 56, generates a unique filter object ID corresponding to the new filter object 56, and installs or inserts the new filter object 56 into a filter object chain 57 in response to an installation request from a server task 34. In the preferred embodiment, the installation request specifies a filter object name that identifies the new filter object 56 according to a type of service associated with the new filter object 56; a message type list that specifies each type of message that a preprocessor message object 52 or a postprocessor message object 53 associated with the new filter object 56 may perform operations upon; a placement order that indicates where the new filter object 56 is to be inserted or installed into a filter object chain 57; a preprocessor message object ID if a preprocessor message object 52 is to be associated with the new filter object 56; a postprocessor message object ID if a postprocessor message object 53 is to be associated with the new filter object 56; a target message object ID that identifies a target message object 51 with which the new filter object 56 is to be associated; and an optional set of installation options.

In response to the installation request, the object management unit 42 creates a new filter object 56 and generates a corresponding unique filter object ID. Referring now to FIG. 6, a block diagram of a preferred embodiment of a filter object 56 is shown. Each filter object 56 is a data structure that includes a first data field storing the filter object ID; a second data field in which a reference to a next and to a previous filter object 56 in a filter object chain 57 are stored when the filter object 56 is installed into a filter object chain 57; a third data field storing the filter object name; a fourth data field storing the message type list; a fifth data field storing the placement order; a sixth data field storing a preprocessor message object ID in the event that the filter object 56 has an associated preprocessor message object 52; a seventh data field storing a postprocessor message object ID in the event that the filter object 56 has an associated postprocessor message object 53; an eighth data field storing the target message object ID; and a ninth data field storing the optionally-specified set of installation options. Each filter object 56 is stored in the filter object memory 49 within the object database 48.

After creating the new filter object 56 and generating the corresponding filter object ID, the object management unit 46 installs the filter object 56 into a given filter object chain 57 according to the specified placement order and installation options. In the preferred embodiment, each filter object's placement order preferably specifies a first filter object name and a second filter object name. When the filter object 56 is installed in a filter object chain 57, the first filter object name indicates that the filter object 56 is to be installed preceding a filter object 56 in the filter object chain 57 that has the first filter object name; and the second filter object name indicates that the filter object 56 is to be installed following a filter object 56 in the filter object chain 57 that has the second filter object name. Thus, the first filter object name provides a "before rule" for installation, and the second filter object name provides an "after rule" for installation. Preferably, the installation options specify a "right-before" option that indicates whether the filter object 56 is to be installed immediately before a filter object 56 in the filter object chain 57 that has the first filter object name. The installation options also preferably specify a "right-after" option that indicates whether the filter object 56 is to be installed immediately after a filter object that has the second filter object name. The detailed operations performed by the object management unit 42 during filter object installation are described in detail below in the context of FIGS. 11A, 11B, 11C, and 11D.

In addition to creating message objects 58, creating port objects 54, and creating and installing filter objects 56, the object management unit 42 provides to a server task 34 information associated with a given message object 58 in response to a message object examination request. The information provided includes the client team ID 33 specified in the given message object, a port object ID specifying the port object 54 with which the given message object 58 is associated, and the current value of the message object's reference constant. The object management unit 42 extracts the client team ID and the current value of the reference constant from the message object 58 itself, and uses the port object address within the message object 58 to retrieve the port object ID from the port object 54 with which the message object 58 is associated. The object management unit 42 also modifies the above information in response to a message object modification request, and deletes a given message object 58 in response to a client team termination message. Additionally, the object management unit 42 provides the filter object ID of each filter object 56 associated with a particular message object 58 in response to a filter object lookup request that specifies a message object ID.

In a manner analogous to the operations provided for message objects 52, the object management unit 42 provides information related to a port object 54 in response to a port object examination request from a server task 34, modifies data fields within the port object 54 in response to a port object modification request, and deletes port objects 52 in response to a port object deletion request.

Similarly, the object management unit 42 provides information related to a filter object 56 in response to a filter object examination request from a server task 34, provides the filter object ID of each filter object in a filter object chain 57 in response to a lookup request that specifies a target message object 51, and deletes a filter object 56 in response to a filter object deletion request. In the filter object deletion request, the object management unit 42 first removes the filter object 57 from the filter chain 57 in which it resides, and then deletes the filter object 56 itself.

The message transaction unit 44 performs the operations required to carry out message transactions. In particular, the message transaction unit 44 performs the operations required to support the sending of messages from client tasks 32 to target message objects 51, the rerouting of messages to preprocessor message objects 52 or postprocessor message objects 53 associated with filter objects 56 in a filter object chain 57, the forwarding of messages to new target message objects 51, the issuance of receive message requests by server tasks 34, the matching of sent or rerouted messages to issued receive message requests, the selective delivery of a message to an acceptance function or to a server task 34 to perform a service indicated by a message, and the transfer of replies from acceptance functions and server tasks 34 to client tasks 32.

The message transaction unit 44 requires that client tasks 32 send messages to target message objects 51 by issuing send message requests. In the preferred embodiment, each send message request is either 1) a synchronous send message request; 2) a synchronous send-and-receive message request; 3) an asynchronous send message request; or 4) an asynchronous send-and-receive message request. As will be described in detail below, in response to either type of synchronous send message request, the message transaction unit 44 blocks the sending client task 32 until the message transaction has completed, thereby preventing the client task 32 from performing other operations while the message transaction is in progress. In contrast, the message transaction unit 44 allows the sending client task 32 to continue other operations in response to either type of asynchronous send message request. Each type of send message request preferably specifies a target message object ID; a reference to a starting memory location at which a message begins; message length information; a message type that provides a categorization of the message; send options that indicate whether the message is to be delivered to an acceptance function or to a server task 34 by reference or by value; and a flag to indicate whether the message object 52 to which the send message request is directed is to be locked in response to the send message request and subsequently unlocked after an acceptance function or a server task 34 has replied to the message. Both synchronous and asynchronous send-and-receive message requests additionally specify a reply buffer address at which a server task can store a reply message or data, and a reply buffer size. In the preferred embodiment, the message type is a 32-bit number.

Each type of synchronous send message request also specifies a maximum time interval that the client task 32 can remain idle while the message transaction occurs. In addition to the information common to every send message request, each type of asynchronous send message request additionally specifies an address at which the message transaction unit 44 can store a message ID signal corresponding to the asynchronous send message request, and event notification information that indicates how the message transaction unit 44 is to notify the client task 32 when the message transaction is complete. In the description that follows, the message ID signal is simply referred to as the message ID.

In response to a given client task's issuance of a send message request, the message transaction unit 44 performs send message operations. The send message operations will be described in detail below in the context of FIG. 12. During the send message operations, the message transaction unit 44 creates a send message control block (MCB) according to whether the send message request is synchronous or asynchronous. In response to a synchronous send message request or a synchronous send-and-receive message request, the message transaction unit 44 creates a synchronous send MCB 60. Referring now to FIG. 7A, a block diagram of a preferred embodiment of a synchronous send MCB 60 is shown. The synchronous send MCB 60 is a data structure including a first data field storing the target message object ID corresponding to the target message object 51 to which the synchronous send message is directed; a second data field storing a current filter object ID corresponding to a filter object 56 currently under consideration within a filter object chain 57; a third data field storing a current message object ID corresponding to a message object 58 associated with the current filter object 56 and currently under consideration either as the target message object 51, a preprocessor message object 52 or a postprocessor message object 53; a fourth data field storing a current port object ID identifying the port object 54 with which the current message object 58 specified in the third data field is associated; a fifth data field storing a filter object stack 59 that identifies filter objects 56 associated with previous target message objects 51 in the event that the message is forwarded to a new target message object 51; a sixth data field providing a reference to a next and to a previous entry in the current port object's pending send message list; a seventh data field specifying the client task ID corresponding to the client task 32 that issued the synchronous send message request; an eighth data field providing the starting address in the memory 20 at which an associated message is stored; a ninth data field providing the length of the message; a tenth data field indicating the message type specified in the synchronous send message request; an eleventh data field wherein the message ID is stored; a twelfth data field specifying the send options indicated in the synchronous send message request; a thirteenth data field that the message transaction unit 44 uses to reference an MCB corresponding to a matching receive message request; a fourteenth data field in which the message transaction unit 44 stores a server task ID after delivering the message to a server task 34; a fifteenth data field indicating whether the message corresponding to the synchronous send message request has been delivered to a server task 34; a sixteenth data field indicating whether the message object 52 identified in the synchronous send request is locked; a seventeenth data field specifying the address of a reply buffer in the event that the send message request is a synchronous send-and-receive message request; a eighteenth data field providing a reply buffer size in the event that the send message request is a synchronous send-and-receive message request; a nineteenth data field indicating whether the sending client task 32 has been blocked as a result of a blocking request; and a twentieth data field specifying the maximum time interval that the sending client task 32 can remain idle during the message transaction. The message transaction unit 44 stores the synchronous send MCB 60 in the object database 48.

If the send message request is an asynchronous send message request or an asynchronous send-and-receive message request, the message transaction unit 44 creates an asynchronous send MCB 62 rather than a synchronous send MCB 60. Referring now to FIG. 7B, a block diagram of an asynchronous send MCB 62 is shown. The asynchronous send MCB 62 is a data structure including a first through an eighteenth data field, each of which specifies information analogous to that specified in the first through eighteenth data fields in the synchronous send MCB 60 described above. In addition, the asynchronous send MCB 62 includes a nineteenth data field wherein the message transaction unit 44 stores the event notification information specified in the asynchronous send message request or asynchronous send-and-receive message request. As in the case of the synchronous send MCB 60, the message transaction unit 44 stores the asynchronous send MCB 62 in the object database 48.

During a message transaction, the message transaction unit 44 selectively routes the send MCB to one or more port objects 54, where each port object is associated with the target message object 51, a preprocessor message object 52, or a postprocessor message object 53 as will be described in detail below. After creating a send MCB, the message transaction unit 44 performs a set of operations referred to herein as examining preprocessor message objects 58. In the consideration of preprocessor message objects 52, the message transaction unit 44 determines whether the send MCB is to be routed to a port object 54 associated with a preprocessor message object 52. The detailed operations performed by the message transaction unit 44 in the examination of preprocessor message objects 52 are described below in the context of FIG. 14.

If the message transaction unit 44 determines that the send MCB is to be routed to a port object 54 associated with a preprocessor message object 52 or a postprocessor message object 53, the message transaction unit 44 performs forward message operations. In the forward message operations, the message transaction unit 44 generates an up-to-date send MCB according to the port object 54 associated with the current message object 52 as given by the current message object ID in the third data field of the send MCB. The forward message operations will be described in detail below in the context of FIGS. 17A, 17B, and 17C.

In order to route a send MCB to a particular port object 54, the message transaction unit 44 performs low-level send operations as will be described in detail below in the context of FIGS. 15A, 15B, and 15C. Herein, the low-level send operations are identical to a subset of the send message operations described in U.S. patent application Ser. No. 08/220,043.

In the present invention, a server task 34 can process a message only after the message has been received from a port object 54. The message transaction unit 44 requires that a server task 34 issue a receive message request to receive a message from a given port object 54. Receive message requests are either synchronous receive message requests, or asynchronous receive message requests. Each type of receive message request specifies a port object 54; a message type indicating a category of message the server task 34 is to receive; a reference to a memory location at which a message buffer begins; and a message buffer size. In the preferred embodiment, the message type is a 32-bit number. A synchronous receive message request further includes a maximum time interval the issuing server task 34 can remain idle prior to the delivery of a message by the message transaction unit 44. In addition to the information common to both synchronous and asynchronous receive message requests, an asynchronous receive message request further specifies a message address at which a receive ID corresponding to the asynchronous receive message request can be stored; and event notification information that the message transaction unit 44 uses to notify the issuing server task 34 that a message corresponding to the asynchronous receive message request has been delivered.

In response to a receive message request, the message transaction unit 44 performs receive message operations, which will be described in detail below in the context of FIGS. 18A and 18B. During the receive message operations, the message transaction unit 44 creates a receive MCB if no send MCB having a message type matching that given in the receive message request is referenced in the pending send message list of the port object 54 to which the receive message request is directed. In other words, the message transaction unit 44 creates a receive MCB if the receive message request cannot be immediately matched to an existing send MCB. The receive MCB created by the message transaction unit 44 is either a synchronous or an asynchronous receive MCB 70, 72, according to whether the receive message request is a synchronous or an asynchronous receive message request, respectively. Referring now to FIG. 8A, a block diagram of a preferred embodiment of a synchronous receive MCB 70 is shown. The synchronous receive MCB 70 is a data structure including a first data field specifying the port object ID corresponding to the port object 54 to which the synchronous receive message request is directed; a second data field referencing a next and a previous entry in the pending receive message list of the port object 54 indicated in the first data field; a third data field wherein the message transaction unit 44 stores a server task ID corresponding to the server task 34 that issued the request; a fourth data field specifying the message buffer address included in the synchronous receive message request; a fifth data field specifying the message buffer size contained in the synchronous receive message request; a sixth data field providing the message type included in the synchronous receive message request; a seventh data field that the message transaction unit 44 uses to reference an MCB corresponding to a send message request that matches the synchronous receive message request according to message type; and an eighth data field wherein the message transaction unit 44 stores the maximum time interval the issuing server task 34 can remain idle as specified in the synchronous receive message request. The message transaction unit 44 stores the synchronous receive MCB 70 in the object database 48.

Referring now to FIG. 8B, a block diagram of a preferred embodiment of an asynchronous receive MCB 72 is shown. The asynchronous receive MCB 72 is a data structure including a first through a seventh data field that specify information analogous to that detailed for the synchronous receive MCB 70. The asynchronous receive MCB 72 also includes an eighth data field wherein the message transaction unit 44 stores the receive ID, and a ninth data field wherein the message transaction unit 44 stores the event notification information specified in the asynchronous receive message request. As in the case of each synchronous receive MCB 70, the message transaction unit 44 stores each asynchronous receive MCB 72 in the object database 48.

In the preferred embodiment, each MCB 60, 62, 70, 72 described above is implemented as a general MCB structure (not shown) plus one or more data fields that supply request-specific information. The general MCB structure includes data fields for specifying a port object 54; a client or server task 32, 34; references to other corresponding MCB structures; and state information specifying whether the general MCB structure corresponds to a synchronous or asynchronous request and whether the general MCB structure corresponds to a send or receive request. Those skilled in the art will be able to determine the specific additional data fields necessary to implement a synchronous MCB 60, an asynchronous send MCB 62, a synchronous receive MCB 70, and an asynchronous receive MCB 72 according to the descriptions provided above.

The message transaction unit 44 selectively matches a receive message request with a send MCB. The message transaction unit 44 selectively matches a send MCB either with an acceptance function or with a receive MCB associated with a port object 54 corresponding to a target message object 51, a preprocessor message object 52, or a postprocessor message object 53 as will be described in detail below. Matching occurs according to the message types specified in a send message request and a receive message request, or according to the message type specified in a send message request and the set of message types associated with an acceptance function. In the preferred embodiment, the message transaction unit 44 performs a logical AND operation to determine whether message types match.

After routing a send MCB to a given port object 54, the message transaction unit 44 may determine that the send MCB can be immediately serviced by a matching acceptance function or that the send MCB can be immediately serviced by a matching pending receive MCB. The message transaction unit 44 may also determine that the send MCB cannot be immediately serviced and must therefore become a pending send MCB. The message transaction unit 44 categorizes the send MCB as pending by inserting a reference to the send MCB into the pending send message list of the port object 54 identified in the send MCB. The message transaction unit 44 preferably maintains the pending send message list of the port object 54 as a doubly-linked list in first-in first-out (FIFO) order.

In response to a given receive message request, the message transaction unit 44 may determine that the receive message request can be immediately matched to a pending send MCB, or that the receive message request cannot be immediately matched to a send MCB and must therefore become a pending receive message request. The message transaction unit 44 categorizes a receive message request as pending by creating a receive MCB and by inserting a reference to the corresponding receive MCB in the pending receive message list of the port object 54 identified in the receive MCB. As with the pending send message list, the message transaction unit 44 preferably maintains the pending receive message list as a doubly-linked list in FIFO order. When the message transaction unit 44 categorizes a synchronous receive message request as pending, the message transaction unit 44 also blocks the execution of the server task 34 that issued the synchronous receive message request until a matching send MCB arrives at the port object 54.

Figure 9:
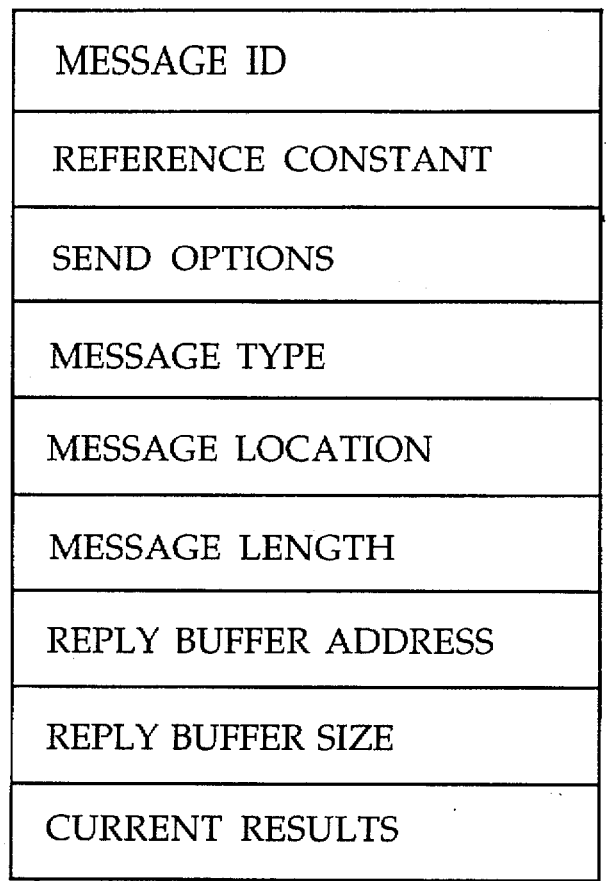
FIG. 9 is a block diagram of a delivery message control block in the present invention.

When the message transaction unit 44 matches a send MCB to a receive MCB, or matches a receive message request to a send MCB, the message transaction unit 44 creates a delivery MCB 80. Referring now to FIG. 9, a block diagram of a delivery MCB 80 is shown. The delivery MCB 80 is created from a subset of the data fields within the send MCB. The delivery MCB 80 includes a first data field in which the message ID specified in the send MCB is stored; a second data field specifying the reference constant of the current message object 58 specified in the send MCB; a third data field in which the send options specified in the send MCB are stored; a fourth data field providing the message type given in the send MCB; a fifth data field in which the message location specified in the send MCB is stored; a sixth data field in which the message length specified in the send MCB is stored; a seventh data field in which any reply buffer address specified in the send MCB is stored; an eighth data field in which any reply buffer size specified in the send MCB is stored; and a ninth data field in which current results obtained from preprocessing, processing, and/or postprocessing during the message transaction can be stored. Preferably, when the delivery MCB 80 is first created, the current results are set to "incomplete." As detailed in U.S. patent application Ser. No. 08/220,043, a server task 34 or an acceptance function obtains the message specified within the delivery MCB 80 and performs the service indicated by the message.

When a server task 34 has completed a service associated with a given port object 54, the server task 34 may issue a continue message request, a forward message request, or a reply. A continue message request preferably specifies a message ID. In response to a continue message request, the message transaction unit 44 performs continue message operations. As will be described in detail in the context of FIGS. 16A, 16B, and 16C, in the continue message operations, the message transaction unit 44 determines whether the message can be transferred to another filter object 56 in the current message object's filter object chain 57 according to a filter object chain scan direction. If the most-recent operation performed upon the message are associated with a preprocessor message object 52, the message transaction unit 44 scans the filter object chain 57 in a "forward" direction towards the last filter object 56 in the filter object chain 57 to identify a next filter object 56 to examine. If the most-recent operation performed upon the message are associated with a postprocessor message object 53, the message transaction unit 44 scans the filter object chain 57 in a "backward" direction towards the first filter object 56 in the filter object chain 57 to identify a previous filter object 56 to examine. If the message can be transferred to another filter object 56 in the current message object's filter object chain 57, the message transaction unit 44 performs the forward message operations. Thus, the continue message operations selectively result in the "continuation" of preprocessing or postprocessing from one filter object 56 to another filter object 56 within the filter object chain 57.

Figure 17A:
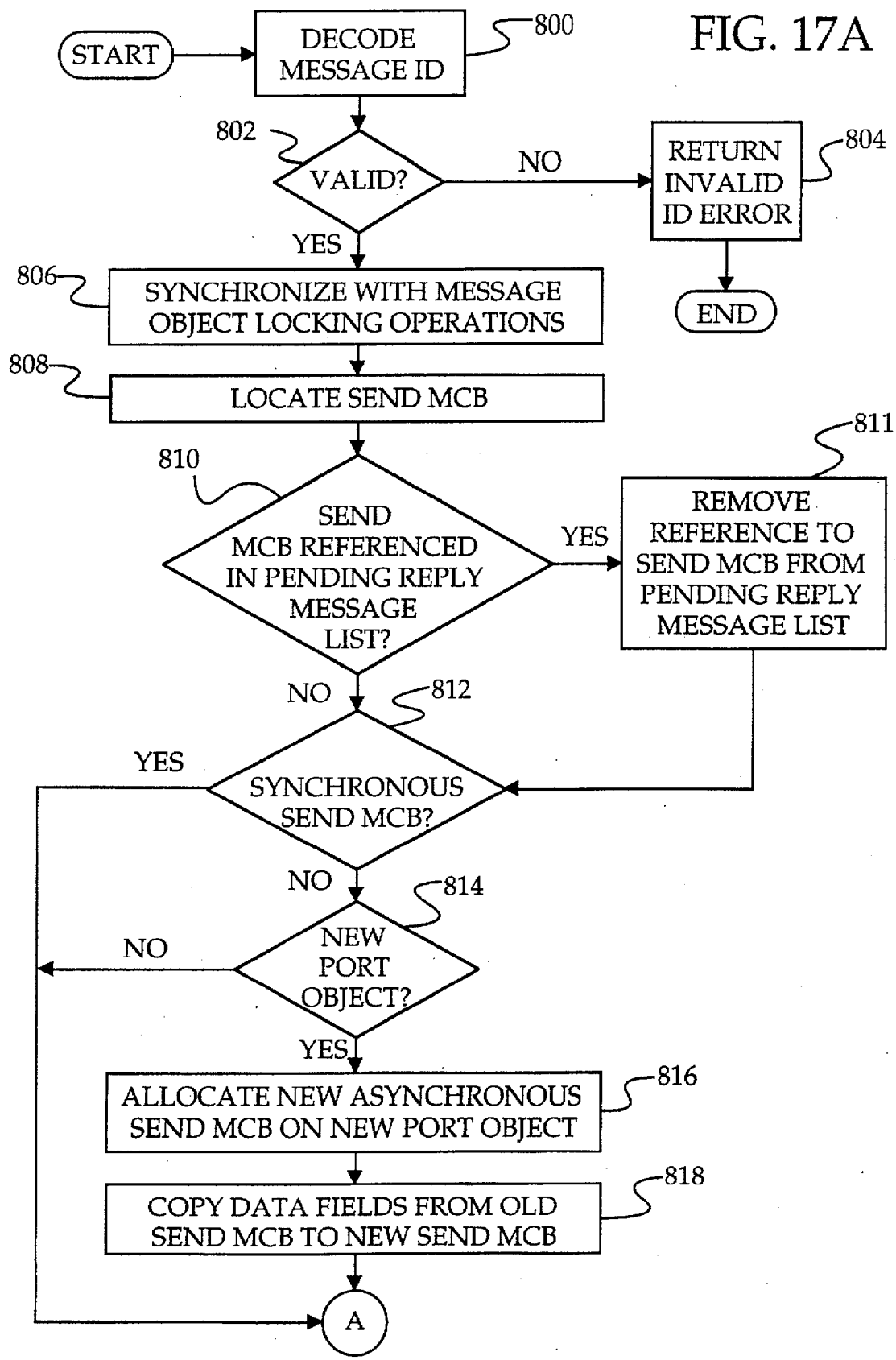
FIGS. 17A, 17B, and 17C are a flowchart of a preferred method for performing forward message operations.
Figure 17B:
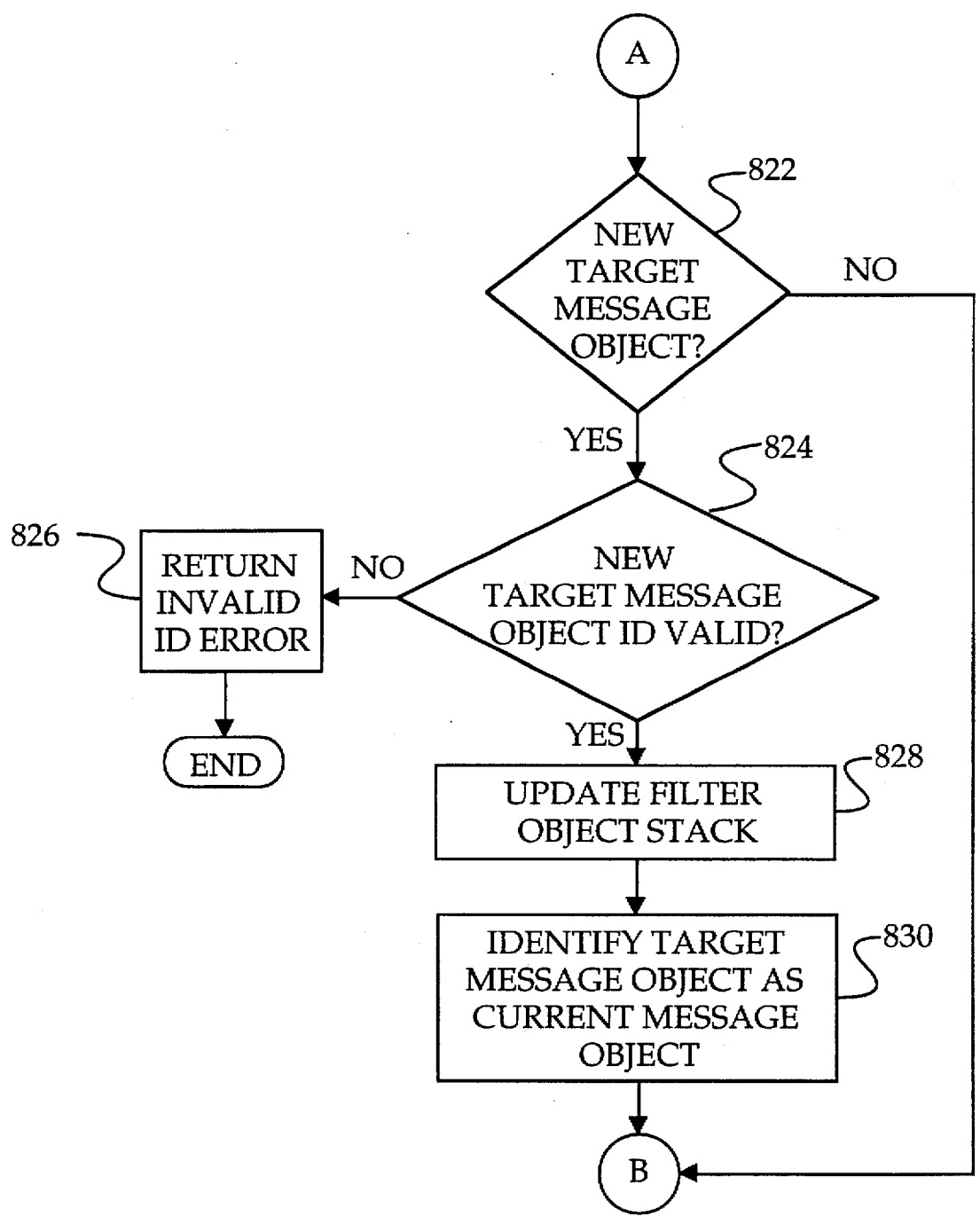
Figure 17C:
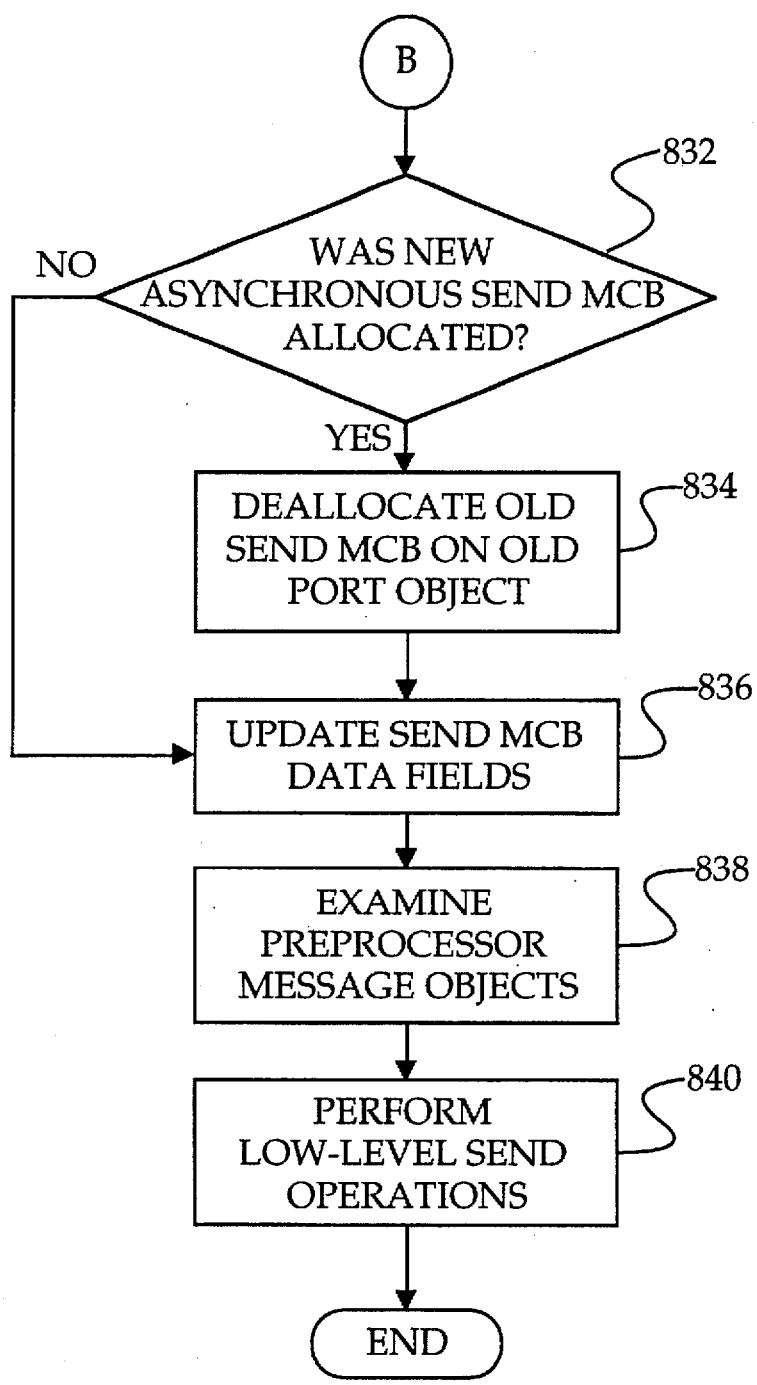

In response to a forward message request, the message transaction unit 44 performs the forward message operations referred to above and described in FIGS. 17A, 17B, and 17C. Each forward message request preferably specifies a message ID and a target message object 51. When the target message object 51 is specified in the forward message request is different from that stored in the send MCB corresponding to the message ID, the forward message operations result in the generation of an up-to-date send MCB that has the newly-specified target message object ID stored in the first data field. Additionally, a reference to each filter object associated with the original target message object 51 is stored in the filter object stack within the up-to-date send MCB.

In response to a reply, the message transaction unit 44 performs reply operations. Each reply preferably specifies a message ID, and may optionally specify a set of current results. In the reply operations, the message transaction unit 44 determines whether the reply has been issued by a server task 34 associated with a preprocessor message object 52. If so, the message transaction unit 44 routes the send MCB corresponding to the message ID to the postprocessor message object 53 associated with the preprocessor message object 52, thereby "skipping" each remaining filter object 56 in view of preprocessing, skipping the target message object 56, and skipping postprocessor message objects 56 associated with the skipped filter objects 56. The message transaction unit's routing of the send MCB from a filter object's associated preprocessor message object 52 to the filter object's associated postprocessor message object 53 is referred to herein as a skip-ahead operation.

If no skip-ahead operation is required, the message transaction unit 44 determines whether each filter object 56 associated with the target message object 51 has been examined in view of postprocessing. If not, the message transaction unit 44 performs continue message operations. If each filter object 56 associated with the target message object 51 has been examined, the message transaction unit 44 issues a final reply to the client task 32 that originally sent the message, where the final reply provides the client task 32 with status information and possibly data. The reply operations are described below in detail in the context of FIGS. 19A and 19B.

In response to a combined receive-and-reply message request issued by a server task 34, the message transaction unit 44 first performs reply operations as described above, and then performs receive message operations as described above.

The locking unit 46 performs message object locking and unlocking operations. In the preferred embodiment, locking and unlocking operations are performed in response to a lock request or an unlock request, respectively, issued by a server task 34 or by the message transaction unit 44. A send message request or a send MCB directed to a particular message object 58 after the message object 58 has been locked is not eligible to be matched to an acceptance function or to a receive MCB until unlocking operations have been performed. In the preferred embodiment, lock requests can be issued by a server task 34, or by the message transaction unit 44 on behalf of a client task 32 as a result of a send message request. Preferably, each lock request specifies the message object ID of a message object 58 targeted for locking. The locking and unlocking operations are described in detail below in the context of FIGS. 20 and 21, respectively.

During send message operations and forward message operations, the message transaction unit 44 synchronizes with locking operations. In synchronizing with locking operations, the message transaction unit 44 blocks the client task 32 that sent a message in the event that the current message object 58 to which the message has been directed is locked. The message transaction unit 44 also locks the target message object 51 in the event that the send MCB specifies that the target message object 51 is to be locked. The detailed operations performed by the message transaction unit 44 in synchronizing with locking operations are described in detail below in the context of FIG. 13.

Figure 10A:
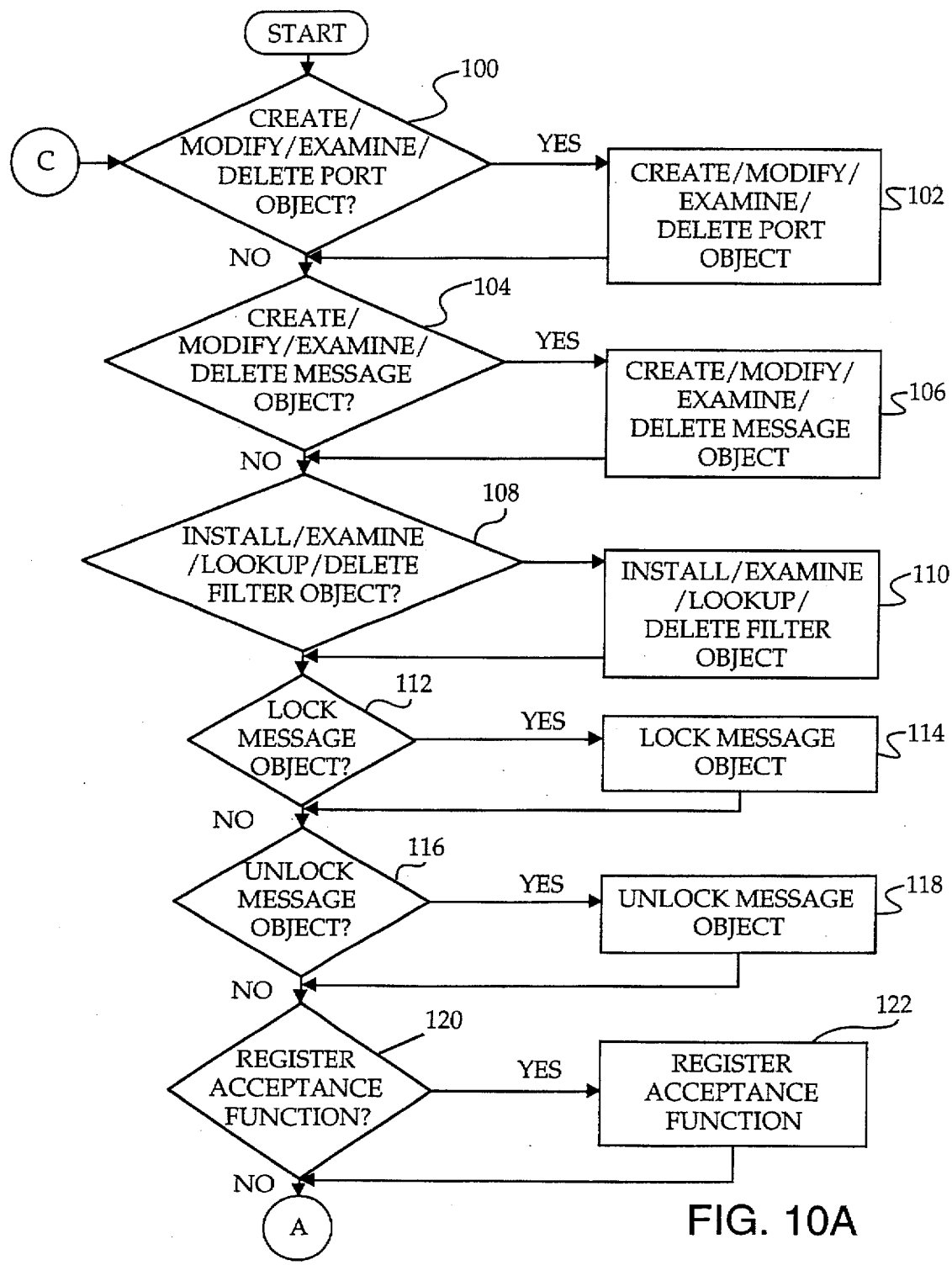
FIGS. 10A, 10B, and 10C are a flowchart of a preferred method for object oriented message filtering in accordance with the present invention.
Figure 10B:
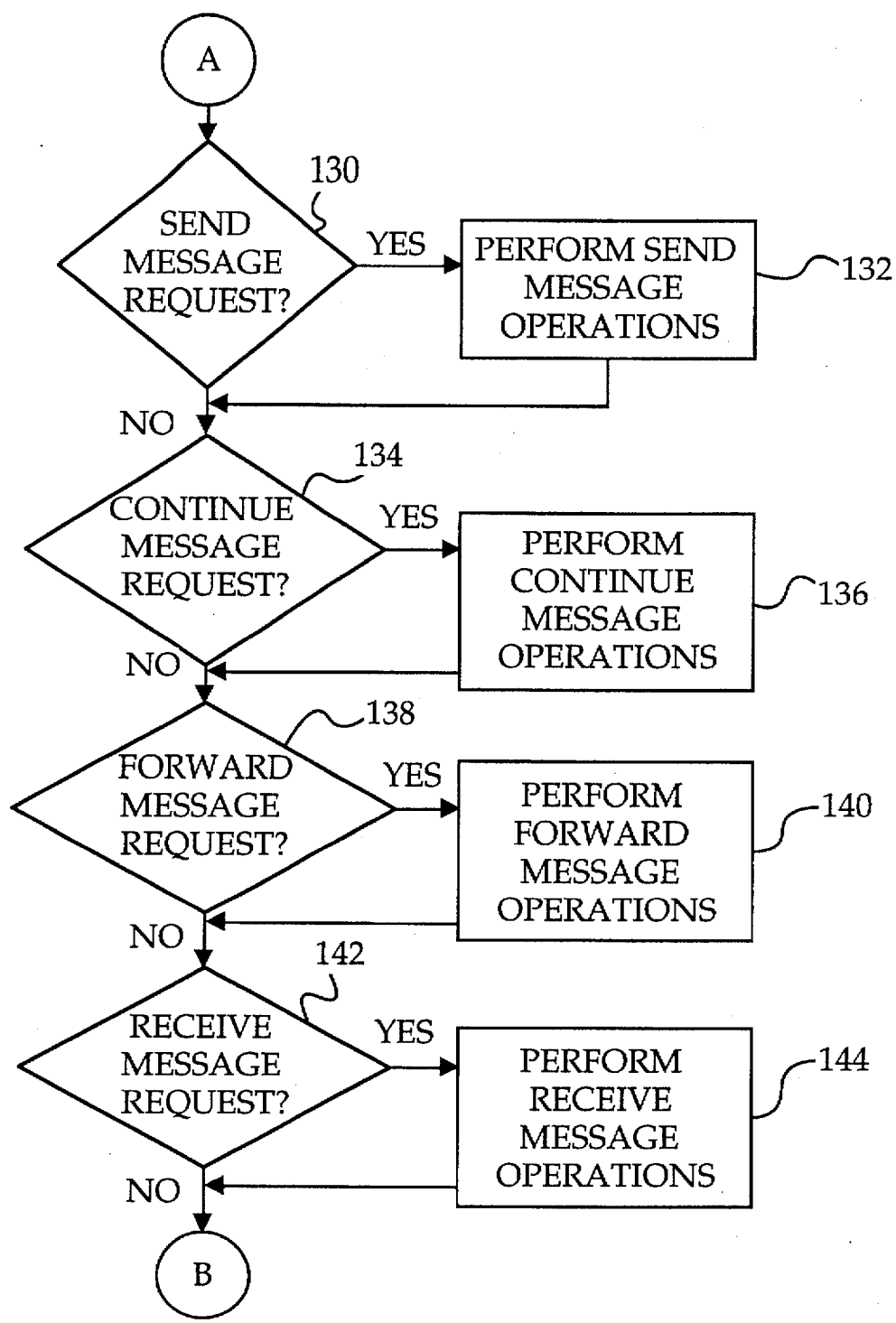
Figure 10C:
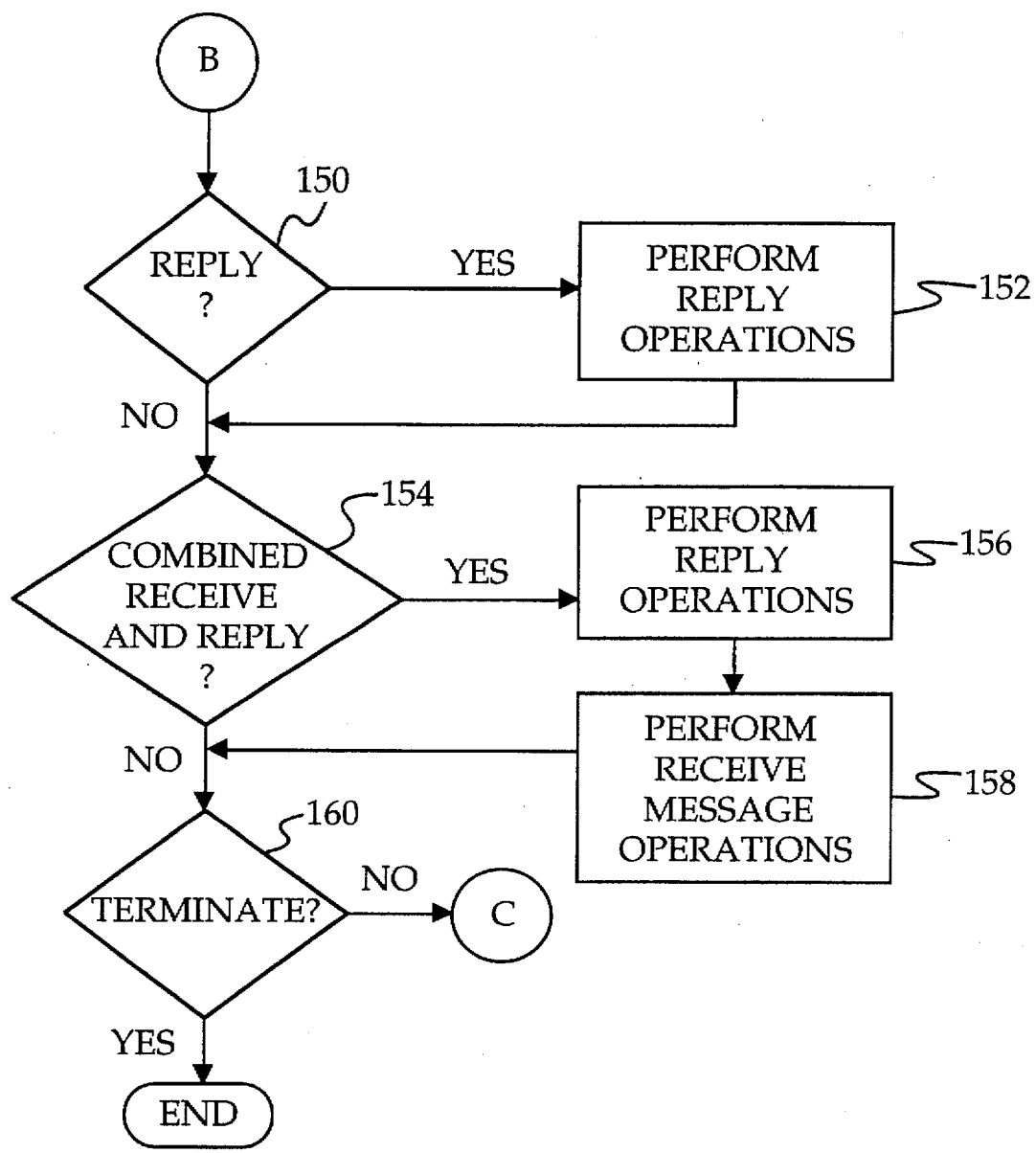
Figure 11A:
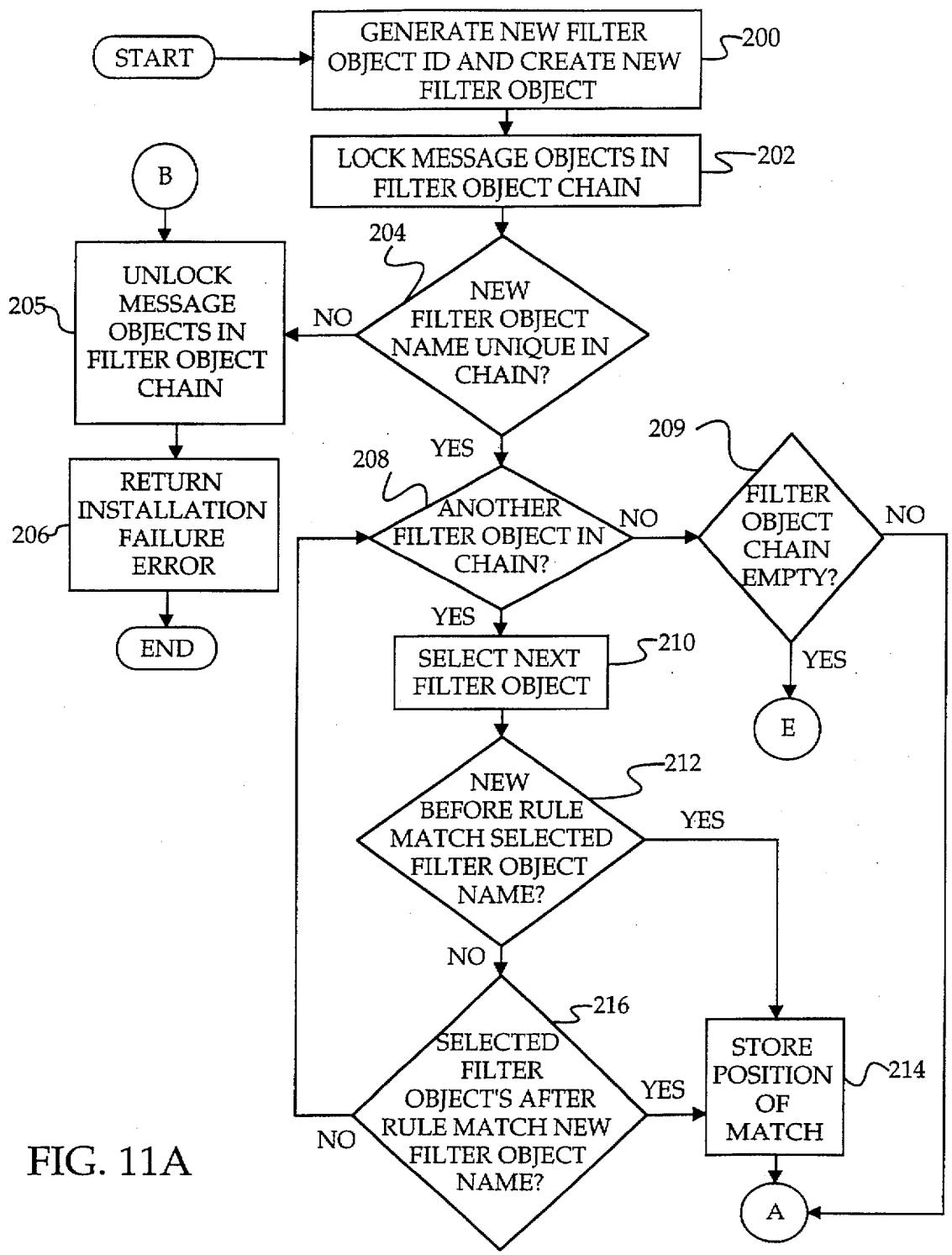
FIGS. 11A, 11B, 11C, and 11D are a flowchart of a preferred method for installing a new filter object into a filter object chain.
Figure 11B:
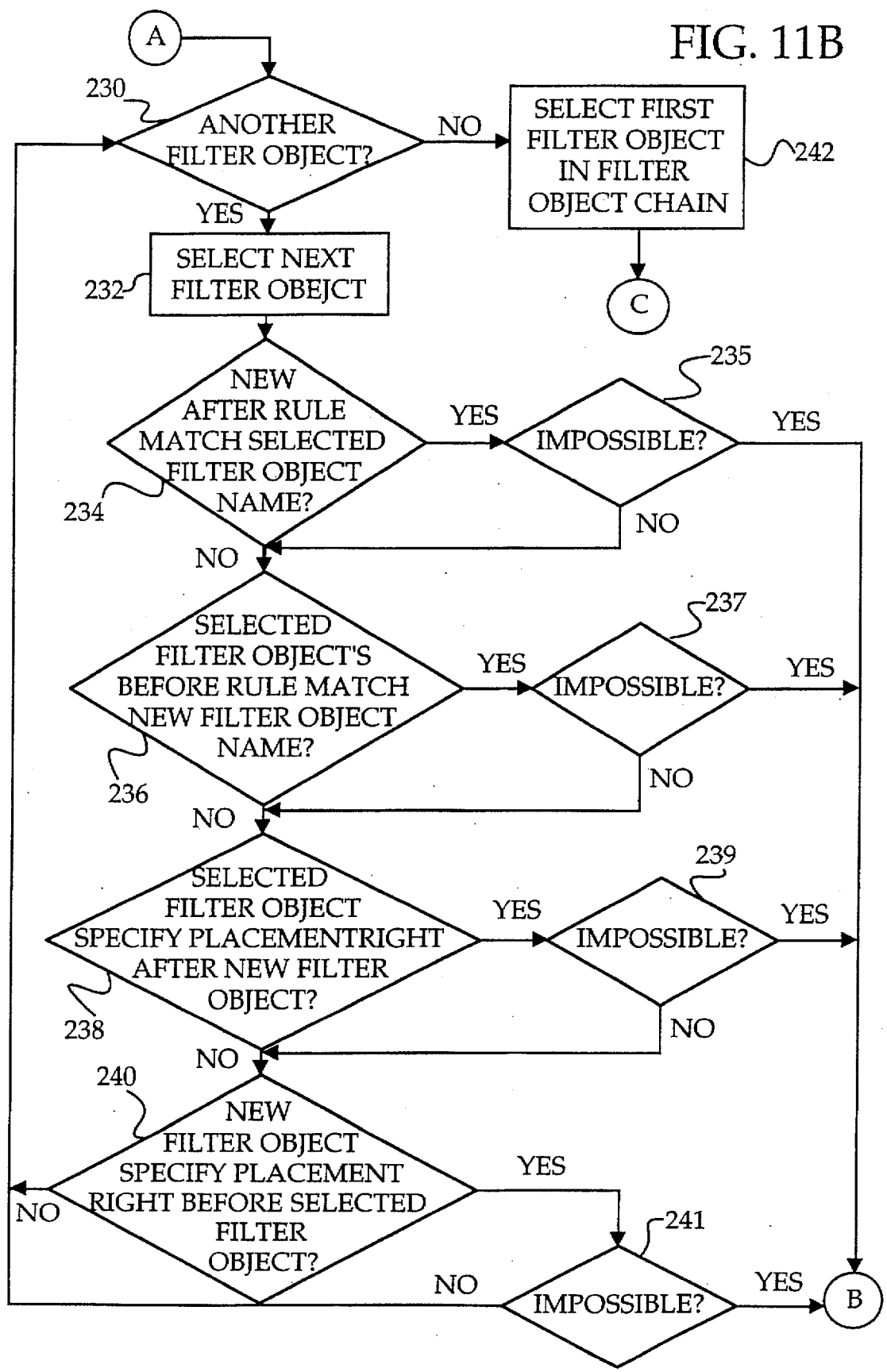
Figure 11C:
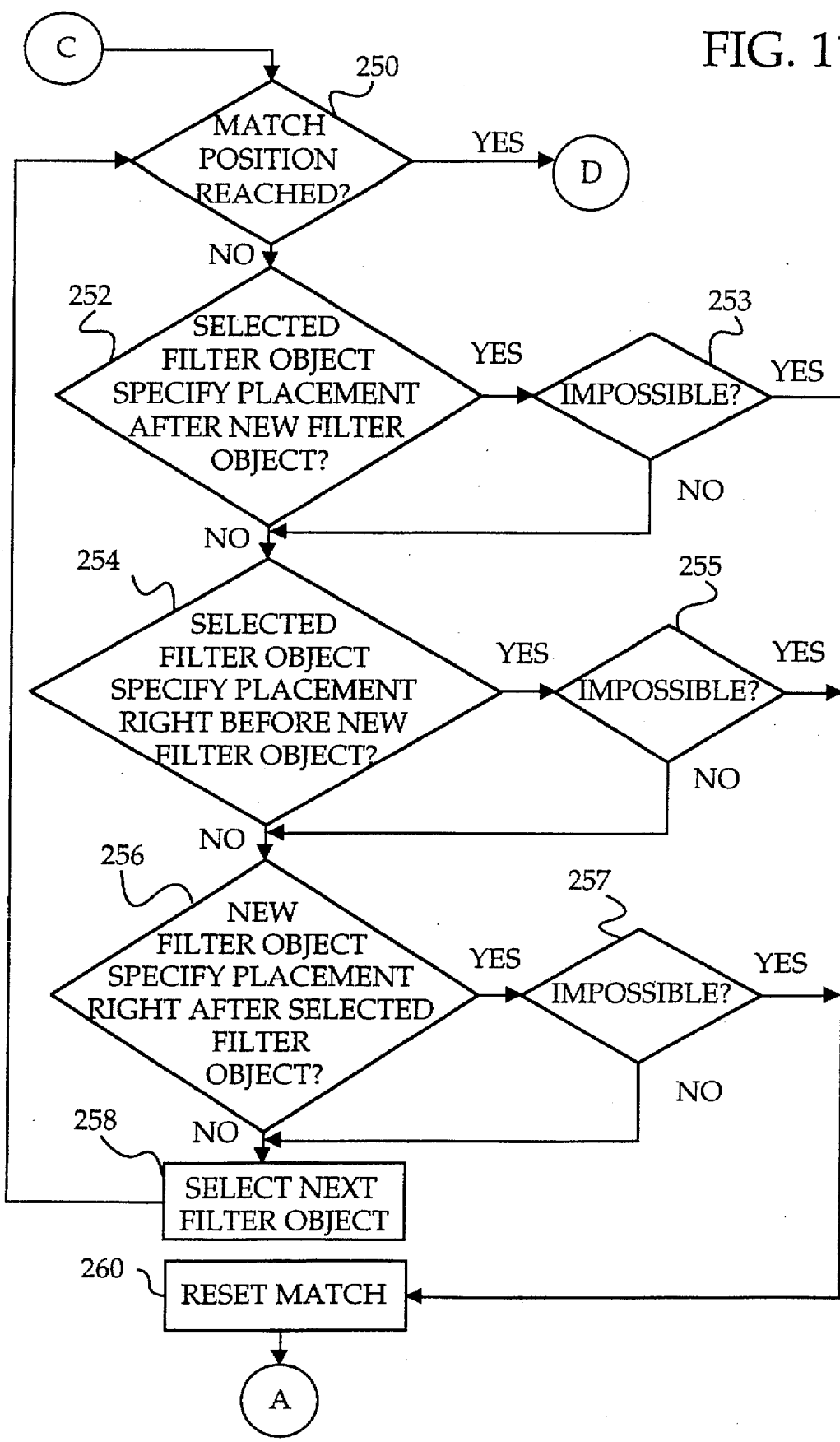
Figure 11D:
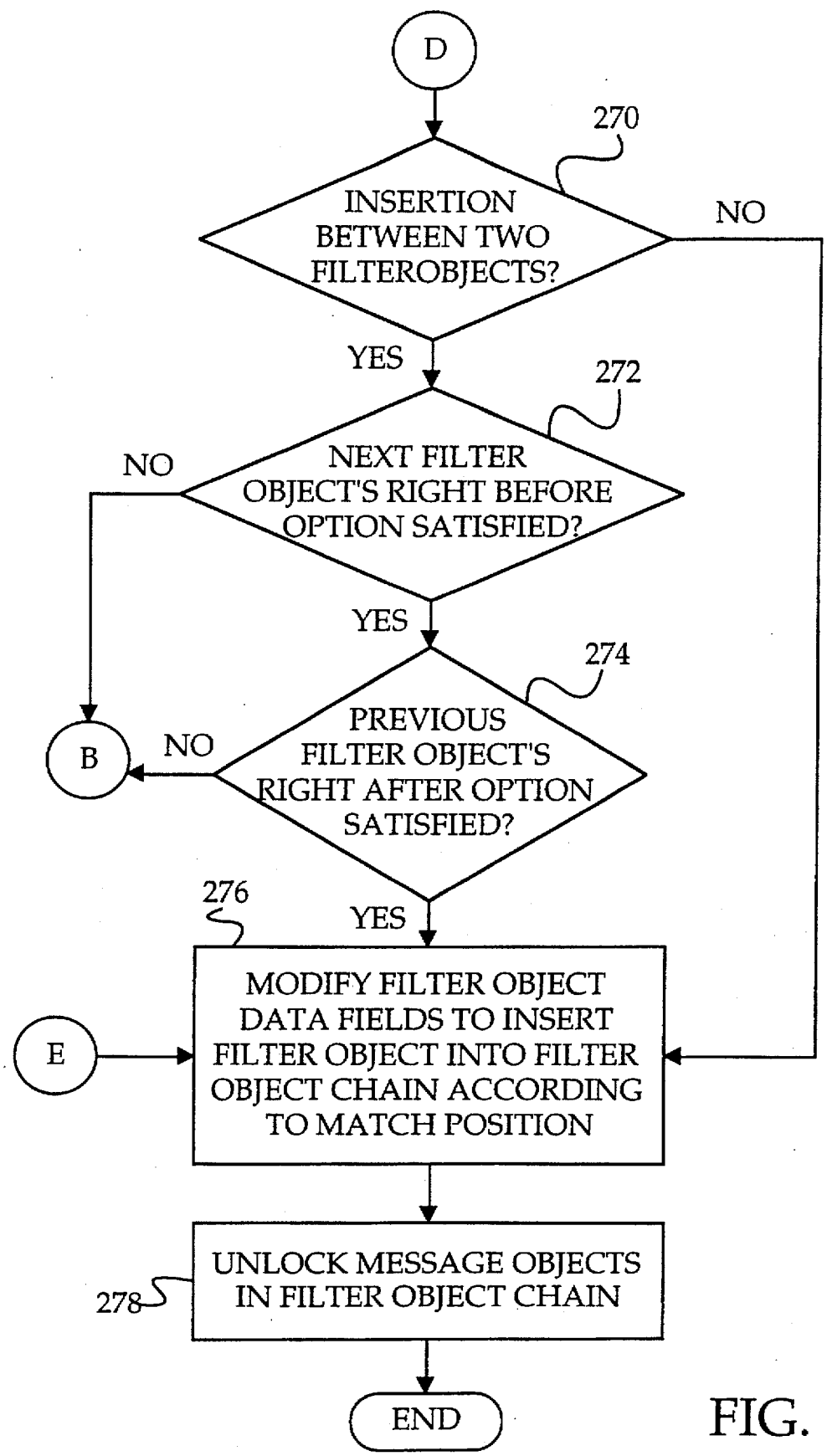

The detailed operations performed by the system 10 of the present invention during object oriented message filtering are now described as individual method steps in FIGS. 10A through FIG. 21. Referring now to FIGS. 10A, 10B, and 10C, a flowchart of a preferred method for object oriented message filtering is shown. The preferred method begins in step 100 with the object management unit 42 determining whether a port object 54 is to be created, modified, examined, or deleted in response to a corresponding server task request. If a port object 54 is to be created, modified, examined, or deleted, the object management unit 42 performs the appropriate operation indicated by the server task request in step 102. After step 102 or after step 100, the object management unit 42 determines in step 104 whether a message object 52 is to be created, modified, examined, or deleted in response to a corresponding server task request. If so, the object management unit 42 performs the action indicated by the server task request in step 106. Following step 106 or step 104, the object management unit 42 determines whether a filter object 56 is to be installed, examined, looked-up, or deleted in step 108 in response to a server task request. If a filter object 56 is to be installed, examined, looked-up, or deleted, the object management unit 42 performs the operation required by the server task request in step 110. After step 110 or after step 108, the locking unit 46 determines in step 112 whether a message object 52 is to be locked in response to a server task lock request. If so, the locking unit 46 performs the locking operations indicated in the server task request in step 114. If in step 108 the locking unit 46 determines that no message object 52 is to be locked, or after step 114, the locking unit 46 next determines in step 116 whether a message object 52 is to be unlocked in response to a server task unlock request. If so, the locking unit 46 performs the unlocking operations in response to the unlock request in step 118. If no message object unlocking is required in step 116, or following step 118, the object management unit 42 determines in step 120 whether an acceptance function is to be registered for a port object 54 in response to a server task request. If an acceptance function is to be registered, the object management unit 42 registers the acceptance function with the port object 54 specified in the server task request in step 122. Step 122 is performed according to the registration of acceptance functions as described in U.S. patent application Ser. No. 08/220,043.

Following step 118, or after step 116 if the object management unit 42 determines that no acceptance function is to be registered, the message transaction unit 44 determines in step 130 whether a client task 32 has issued a send message request. If so, the message transaction unit 44 performs send message operations in step 132. After step 132, or after step 130 if no send message request has been issued, the message transaction unit 44 determines in step 134 whether a server task has issued a continue message request. If a server task 34 has issued a continue message request, the message transaction unit 44 performs continue message operations in step 136. After step 136, or after step 134, the message transaction unit 44 determines whether a server task 34 has issued a forward message request in step 138. If a server task 34 has issued a forward message request, the message transaction unit 44 performs forward message operations in step 140. Following step 140, or after step 138, the message transaction unit 44 determines in step 142 whether a server task 34 has issued a receive message request. If a server task 34 has issued a receive message request, the message transaction unit 44 performs receive message operations in step 144. If in step 132 the message transaction unit 44 determines that no receive message request has been issued, or after step 134, the message transaction unit 44 determines in step 150 whether a reply has been issued. If so, the message transaction unit performs reply operations in step 152. Following step 152, or following step 150 if no reply has been issued, the message transaction unit 44 determines whether a server task 34 has issued a combined receive-and-reply message request in step 154. If so, the message transaction unit 44 performs the reply operations indicated in the receive-and-reply message request in step 156, after which the message transaction unit 44 performs receive message operations corresponding to the receive-and-reply message request in step 158. After step 158, or after step 154 if step 156 is not performed, the message transaction unit 44 determines whether operation is to terminate in step 160. If operation is to continue, the preferred method proceeds to step 100. Otherwise, the preferred method ends.

Referring now to FIGS. 11A, 11B, 11C, and 11D, a flowchart of a preferred method for installing a new filter object 56 into a filter object chain 57 (step 110 of FIG. 10A) is shown. The preferred method begins in step 200 with the object management unit 42 generating a new filter object ID and creating a new filter object 56 in response to an installation request issued by a server task 34. Next, in step 202, the object management unit 42 locks each preprocessor and postprocessor message object 52, 53 associated with the target message object specified in the installation request. After step 202, the object management unit 42 determines whether the new filter object name is unique among all filter objects in the filter object chain 57. If the new filter object name is not unique, the object management unit 42 unlocks the preprocessor and postprocessor message objects 52, 53 in the filter object chain in step 205, and then returns an installation failure error in step 206. After step 206, the preferred method ends.

If the new filter object name is unique among all filter objects in the filter object chain 57 in step 204, the object management unit 42 next determines in step 208 whether another filter object 56 is present in the filter object chain 57 in a forward direction in step 208. If another filter object 56 is not present in the filter object chain 57, the object management unit 42 determines in step 209 whether the filter object chain 57 is empty. If the filter object chain 57 is empty, the preferred method proceeds to step 276.

If the object management unit 42 determines in step 208 that another filter object 56 is present in the filter object chain 57, the object management unit 42 selects a next filter object 56 in step 210. Next, in step 212, the object management unit 42 determines whether the new filter object's before rule matches the selected filter object name. If so, the object management unit 42 stores the position of the selected filter object in the filter object chain 57 in step 214. If the new filter object's before rule does not match the selected filter object name in step 212, the object management unit 42 next determines in step 216 whether the selected filter object's after rule matches the new filter object name. If so, the preferred method proceeds to step 214. If the selected filter object's after rule does not match the new filter object name, the preferred method returns to step 208.

After step 214, or after step 209 in the event that the filter object chain 57 is not empty, the object management unit 42 determines whether another filter object 56 is present in the filter object chain 57 in step 230. If so, the object management unit 42 selects the next filter object in step 232. Next, the object management unit 42 determines whether the new filter object's after rule matches the selected filter object name in step 234. If so, the object management unit 42 determines in step 235 whether the match specifies an impossible filter object chain ordering. If the match specifies an impossible filter object chain ordering, the preferred method returns to step 205.

After step 235, or after step 234, the object management unit 42 determines whether the selected filter object's before rule matches the new filter object name in step 236. If so, the object management unit 42 determines in step 237 whether the match specifies an impossible filter object chain ordering. If the match specifies an impossible filter object chain ordering, the preferred method returns to step 205.

After step 237, or after step 236, the object management unit 42 determines whether the selected filter object's installation options specify that the selected filter object 56 is to be immediately after the new filter object 56 in the filter object chain 57 in step 238. If the selected filter object's installation options specify that the selected filter object 56 is to immediately follow the new filter object 56, the object management unit 42 determines in step 239 whether this ordering is impossible. If so, the preferred method returns to step 205.

After step 239, or after step 238, the object management unit 42 determines in step 240 whether the new filter object's installation options specify that the new filter object 56 is to be immediately before the selected filter object 56 in the filter object chain 57. If the new filter object's installation options specify that the new filter object 56 is to immediately precede the selected filter object 56, the object management unit 42 determines in step 241 whether this ordering is impossible. If so, the preferred method returns to step 205.

If in step 230 the object management unit 42 determines that another filter object 56 is not present in the filter object chain 57, the object management unit 42 selects the first filter object 56 in the filter object chain 57 in step 242. After step 242, the object management unit 42 determines whether the position of the selected filter object 56 in the filter object chain 57 is the match position that was stored in step 214. If not, the object management unit 42 determines in step 252 whether the selected filter object's placement order specifies that the selected filter object 56 is to follow the new filter object 56 in the filter object chain 57. If the selected filter object's placement order specifies that the selected filter object 56 is to follow the new filter object 56 in the filter object chain 57, the object management unit 42 next determines in step 253 whether this ordering is impossible. If so, the preferred method proceeds to step 260. In step 260, the object management unit 42 resets the match position that was stored in step 214, after which the preferred method returns to step 230.

After step 253, or after step 252, the object management unit 42 determines whether the selected filter object's installation options specify that the selected filter object 56 is to immediately precede the new filter object 56 in the filter object chain 57. If the selected filter object's installation options specify that the selected filter object 56 is to immediately precede the new filter object 56 in the filter object chain 57, the object management unit 42 determines in step 255 whether this ordering is impossible. If so, the preferred method proceeds to step 260.

After step 255, or after step 254, the object management unit 42 determines in step 256 whether the new filter object's installation options specify that the new filter object 56 is to immediately follow the selected filter object 56 in the filter object chain 57. If the new filter object's installation options specify that the new filter object 56 is to immediately follow the selected filter object 56 in the filter object chain 57, the object management unit 42 determines in step 257 whether this ordering is impossible. If so, the preferred method proceeds to step 260.

After step 257, or after step 256, the object management unit 42 selects the next filter object 56 in the filter object chain 57, after which the preferred method returns to step 250.

If in step 250 the determines that the match position that was stored in step 214 has been reached, the object management unit 42 next determines whether the new filter object 56 is to be installed between two filter objects 56 in the filter object chain 57. If so, the object management unit 42 determines in step 272 whether the right-before option in the filter object 56 before which the new filter object 56 is to be inserted can be satisfied. If the right-before option cannot be satisfied, the preferred method returns to step 205. If the right-before option can be satisfied, the object management unit 42 next determines in step 274 whether the right-after option in the filter object 56 after which the new filter object 56 is to be inserted can be satisfied. If the right-after option in the filter object 56 after which the new filter object 56 is to be inserted cannot be satisfied, the preferred method returns to step 205.

After step 274, the object management unit 42 modifies the second data field in the new filter object 56 such that it references the appropriate next and previous filter objects 56 in the filter object chain 57 in step 276. The object management unit 42 also modifies the second data fields in the filter objects 56 immediately preceding and immediately following the location at which the new filter object 56 is to be positioned in the filter object chain 57 in a like manner. The performance of step 276 effectively makes the new filter object a part of the filter object chain 57. After step 276, the object management unit 42 unlocks each preprocessor and postprocessor message object 52, 53 associated with the filter object chain 57 in step 278, after which the preferred method ends.

Figure 12:
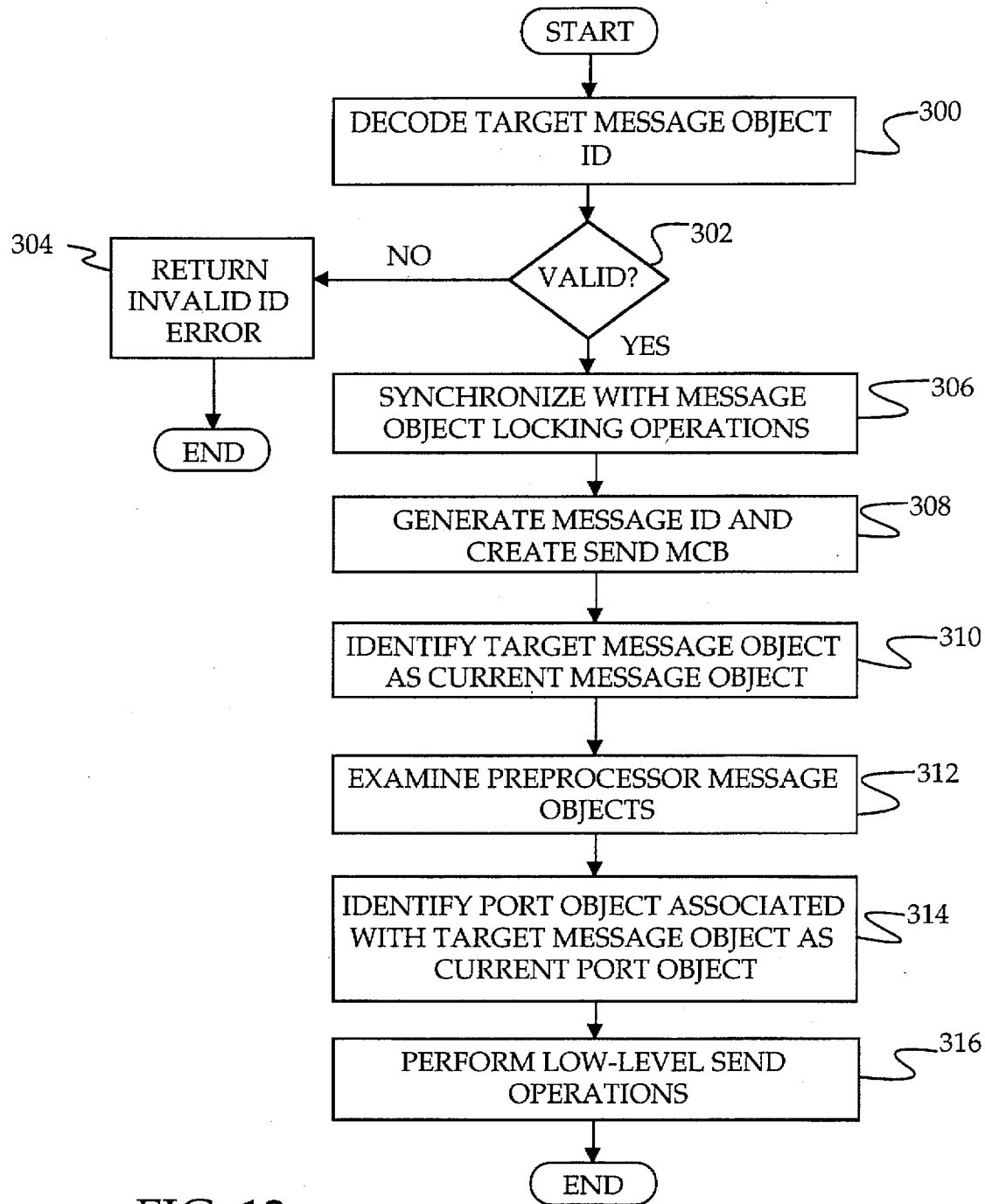
FIG. 12 is a flowchart of a preferred method for performing send message operations.

Referring now to FIG. 12, a flowchart of a preferred method for performing send message operations (step 132 of FIG. 10B) is shown. The preferred method begins in step 300 with the message transaction unit 44 decoding the target message object ID specified in the corresponding send message request. Next, the message transaction unit 44 determines whether the target message object ID is valid in step 302. If the target message object ID is not valid, the message transaction unit 44 returns an invalid ID error in step 304, after which the preferred method ends. If the target message object ID is valid, the message transaction unit 44 synchronizes with message object locking operations in step 306. Next, the message transaction unit 44 generates a unique message ID and creates a send MCB in step 308. Preferably, the message transaction unit 44 associates the send MCB with the message ID, such that the send MCB can be uniquely identified and located by the message ID. If the send message request is a synchronous send message request, the message transaction unit 44 creates a synchronous send MCB 60. If the send message request is an asynchronous send message request, the message transaction unit 44 creates an asynchronous send MCB 62.

After step 308, the message transaction unit 44 identifies the target message object as the current message object under consideration in step 310 by storing the target message object ID specified in the first data field of the send MCB into the third data field of the send MCB. Next, in step 312, the message transaction unit 44 examines preprocessor message objects 52. The examination of preprocessor message objects 52 is described in detail below with reference to FIG. 14. After step 312, the message transaction unit 44 identifies the port object 54 associated with the target message object 51 as the current port object 54 in step 314 by storing the corresponding port object ID in the fourth data field of the send MCB. The message transaction unit 44 then performs low-level send message operations in step 316, after which the preferred method ends.

Figure 13:
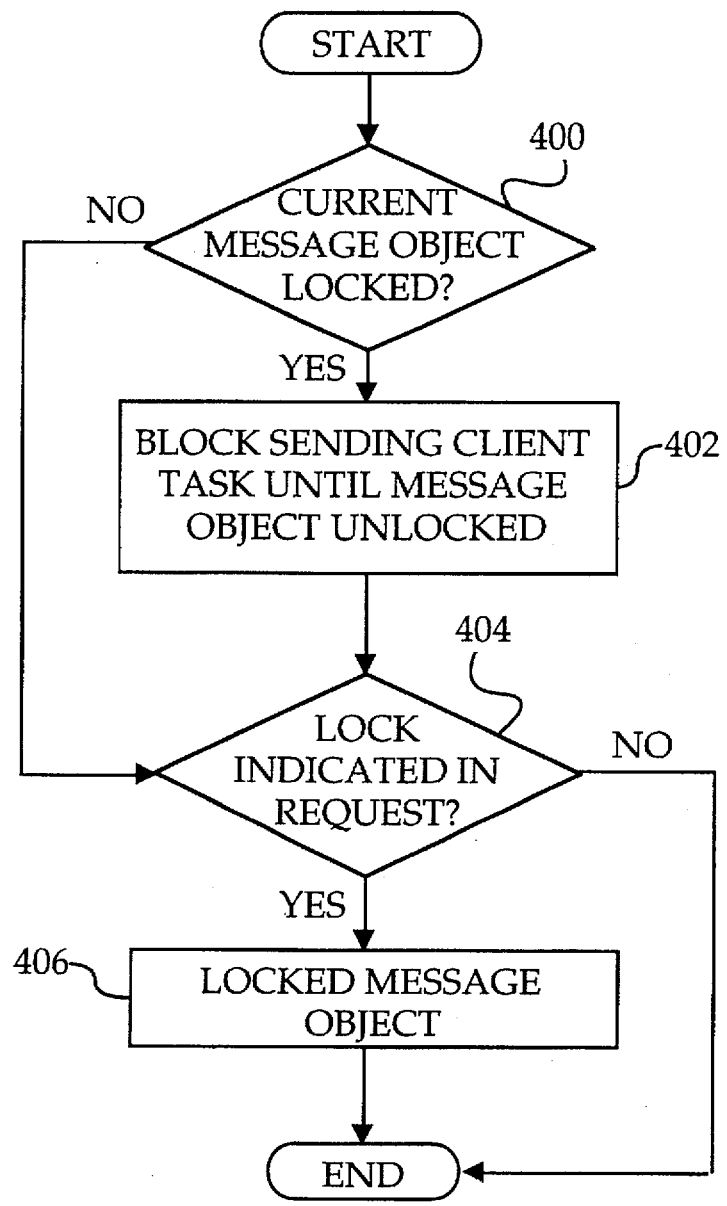
FIG. 13 is a flowchart of a preferred method for synchronizing with message object locking operations.

Referring now to FIG. 13, a flowchart of a preferred method for synchronizing with locking operations (step 300 of FIG. 12) is shown. The preferred method begins in step 400 with the message transaction unit 44 determining whether the current message object 58 is locked. If the current message object 58 is locked, the message transaction unit 44 blocks the client task 32 indicated in the send MCB by preventing the client task 32 from performing further operations in step 402. Client task blocking is performed in a conventional manner. After step 402, or after step 400, the message transaction unit 44 determines in step 404 whether the current message object 58 is to be locked by examining the send options specified in the send MCB. If the current message object 58 is to be locked, the message transaction unit 44 locks the current message object 58 in step 406. After step 406, or after step 404, the preferred method ends.

Figure 14:
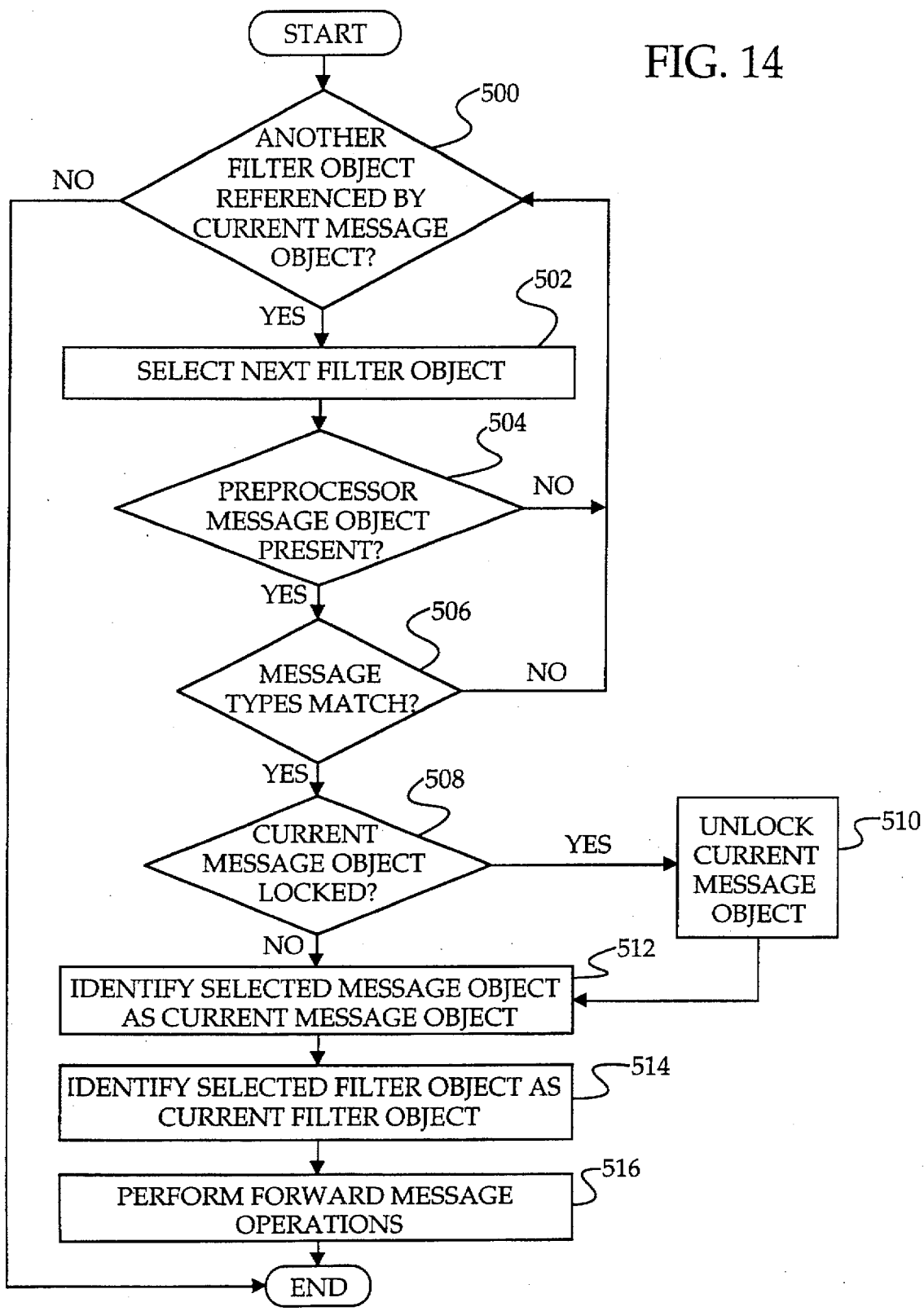
FIG. 14 is a flowchart of a preferred method for examining preprocessor message objects.

Referring now to FIG. 14, a flowchart of a preferred method for examining preprocessor message objects 52 (step 312 of FIG. 12 and step 838 of FIG. 17C) is shown. The preferred method begins in step 500 with the message transaction unit 44 determining whether another filter object 56 is referenced in the filter object chain 57 associated with the current message object 58. If another filter object 56 is not referenced by the current message object 58, the preferred method ends. If another filter object 58 is referenced in the filter object chain 57 associated with the current message object 58, the message transaction unit 44 selects the next filter object 56 in the filter object chain 57 in step 502. After step 502, the message transaction unit 44 determines in step 504 whether the selected filter object 56 has an associated preprocessor message object 52 by examining the sixth data field in the selected filter object 56. If the selected filter object 56 does not have an associated preprocessor message object 52, the preferred method returns to step 500. If the selected filter object 56 has an associated preprocessor message object 52, the message transaction unit 44 next determines in step 506 whether the message type specified in the send MCB matches a message type given in the selected filter object's message type list. If the message type specified in the send MCB does not match a message type in the selected filter object's message type list, the preferred method returns to step 400. If the message type specified in the send MCB matches a message type in the selected filter object's message type list, the message transaction unit 44 next determines whether the current message object 58 is locked in step 508. If the current message object 58 is locked, the message transaction unit 44 unlocks the current message object 58 in step 510. After step 510, or after step 508, the message transaction unit 44 identifies the preprocessor message object 52 associated with the selected filter object 56 as the current message object in step 512 by storing the message object ID associated with the preprocessor message object 52 in the third data field of the send MCB. The message transaction unit 44 then identifies the selected filter object 56 as the current filter object 56 in step 514 by storing the corresponding filter object ID in the second data field of the send MCB. After step 514, the message transaction unit 44 performs forward message operations in step 516. Forward message operations are described in detail below with reference to FIGS. 17A, 17B, and 17C. Following step 516, the preferred method ends.

Figure 15A:
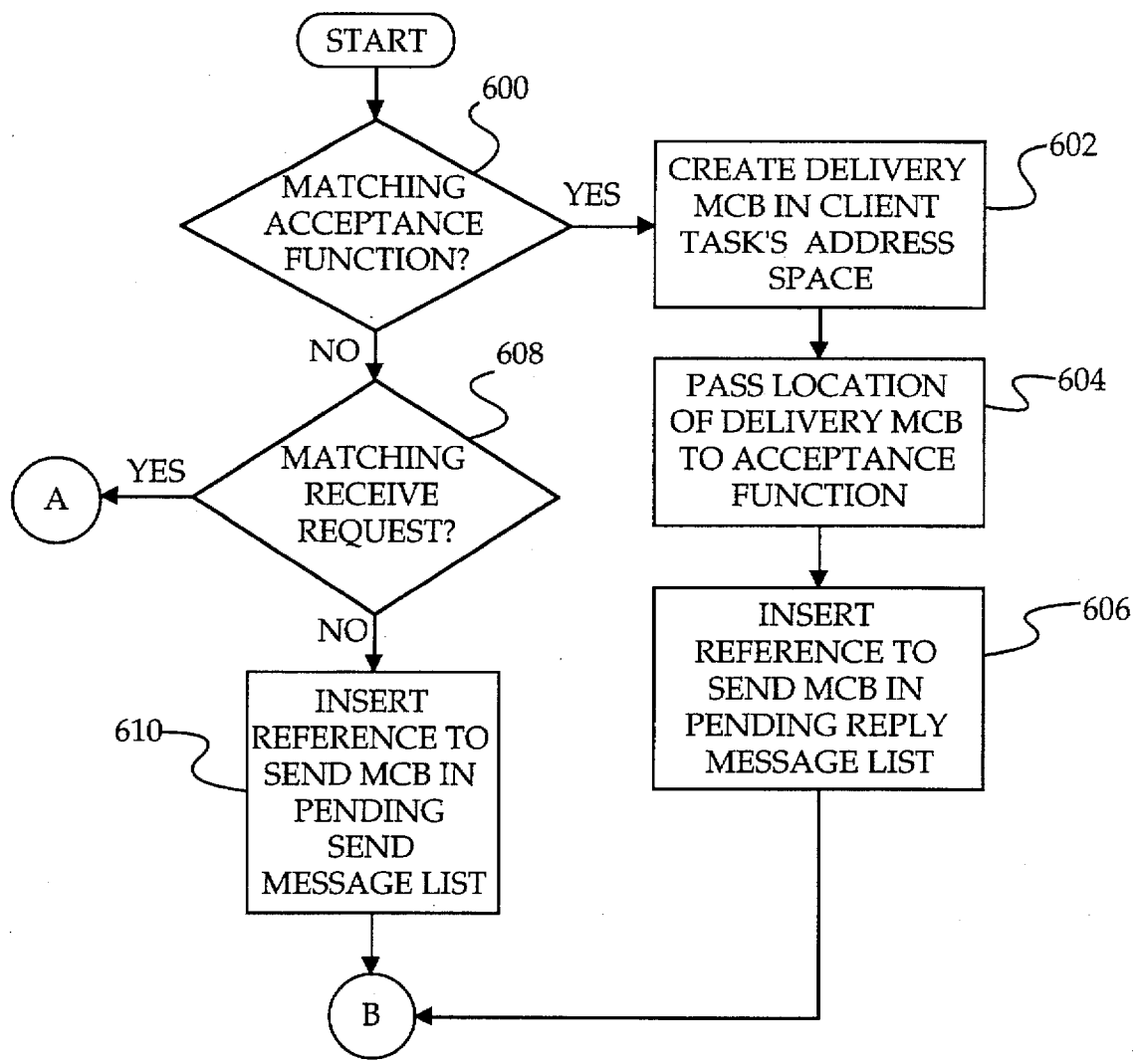
FIGS. 15A, 15B, and 15C are a flowchart of a preferred method for performing low-level send/message operations.
Figure 15B:
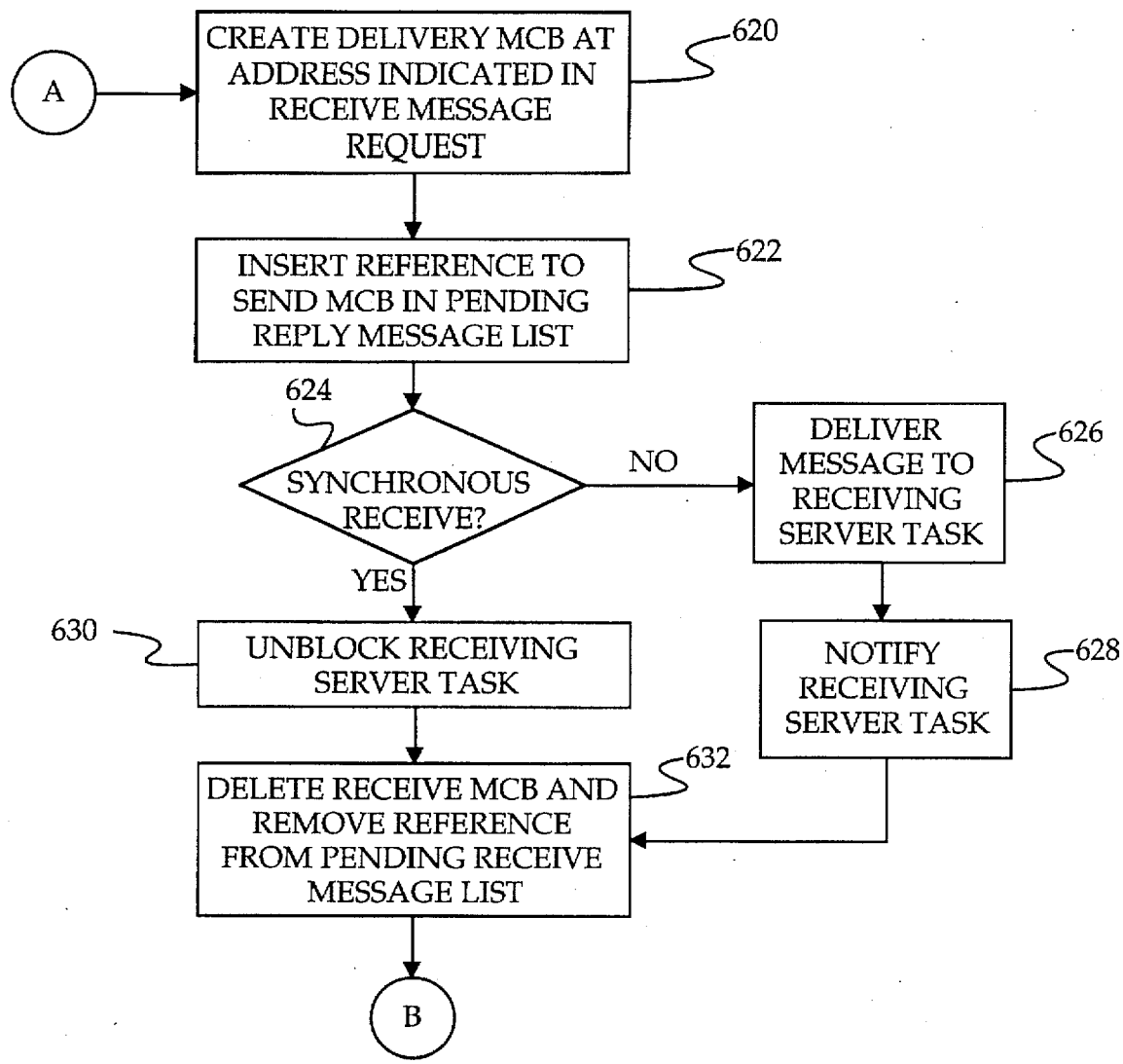
Figure 15C:
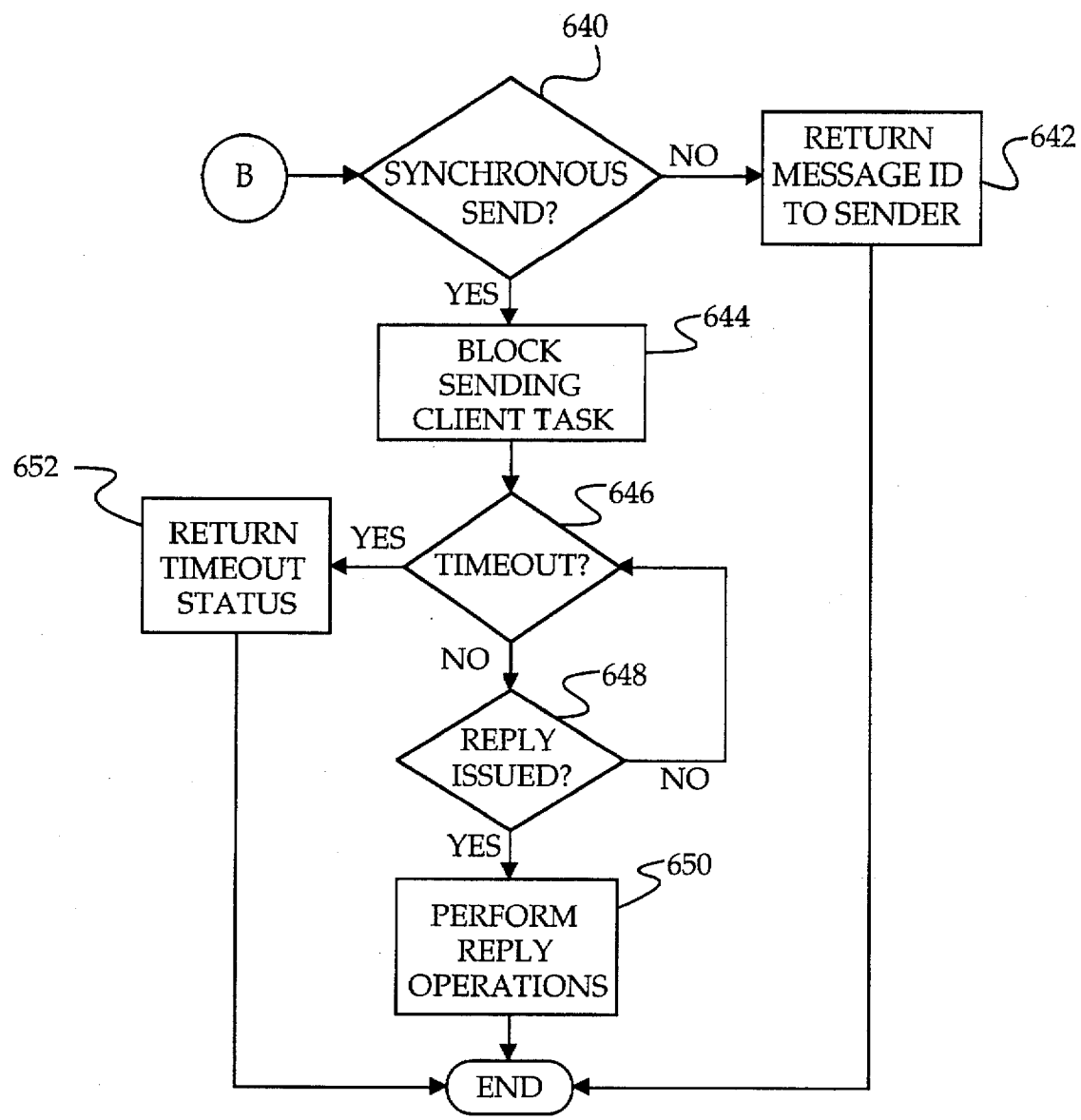

Referring now to FIGS. 15A, 15B, and 15C, a flowchart of a preferred method for performing low-level send operations (step 316 of FIG. 12 and step 840 of FIG. 17C) is shown. The preferred method begins in step 600 with the message transaction unit 44 determining whether an acceptance function specifying a message type that matches the message type in the send MCB has been registered with the current port object 54 specified in the send MCB. If an acceptance function has been registered, the message transaction unit 44 creates a delivery MCB 80 in the client task's address space in step 602. Following step 602, the message transaction unit 44 passes a pointer to the delivery MCB 80 to the acceptance function in step 604. Next, the message transaction unit 44 inserts a reference to the send MCB in the pending reply message list within the current port object 54 in step 606.

After step 606, the message transaction unit 44 determines whether the send MCB created is a synchronous send MCB 60 in step 640 of FIG. 15C. If not, the message transaction unit 44 returns the message ID to the client task 32 that issued the send message request in step 642, after which the preferred method ends. If the send MCB is a synchronous send MCB 60, the message transaction unit 44 next prevents the sending client task 32 from performing further operations, that is, blocks the sending client task 32, in step 644. Next, in step 646, the message transaction unit 44 determines whether the maximum time interval specified in the send MCB has been exceeded. If so, the message transaction unit 44 returns a timeout status to the sending client task 32, after which the preferred method ends. If the maximum time interval has not been exceeded, the message transaction unit 44 determines whether a reply has been issued to the message indicated in the send message request in step 648. If no reply has been issued, the preferred method returns to step 646. If in step 648 the message transaction unit 44 determines that a reply has been issued, the message transaction unit 44 performs reply operations in step 650. Following step 650, the preferred method ends.

If in step 600 the message transaction unit 44 determines that a matching acceptance function is not present, the message transaction unit next determines whether a matching receive MCB is present in the current port object's pending receive message list in step 608. If a matching receive MCB is not present, the message transaction unit 44 inserts a reference to the send MCB in the current port object's pending send message list in step 610, after which the preferred method proceeds to step 640. If the message transaction unit 44 determines that a matching receive MCB is present in step 608, the message transaction unit 44 creates a delivery MCB at the message buffer address specified within the matching receive MCB in step 620 of FIG. 15B. Next, the message transaction unit 44 inserts a reference to the send MCB in the current port object's pending reply message list in step 622. Following step 622, the message transaction unit 44 determines in step 624 whether the receive MCB is a synchronous receive MCB 70. If so, the message transaction unit 44 unblocks the receiving server task 34 that issued the corresponding receive message request in step 630. If the message transaction unit 44 determines that the receive MCB is not a synchronous receive MCB 70, the message transaction unit 44 delivers the message referenced in the send MCB to the server task 34 identified in the asynchronous receive MCB 72 in step 626. Following step 626, the message transaction unit 44 notifies the receiving server task 34 according to the event notification information specified in the asynchronous receive MCB 72 in step 628. After step 628, or after step 630, the message transaction unit 44 deletes the receive MCB and its corresponding pending receive message list reference in step 632. Following step 632, the preferred method proceeds to step 640.

Figure 16A:
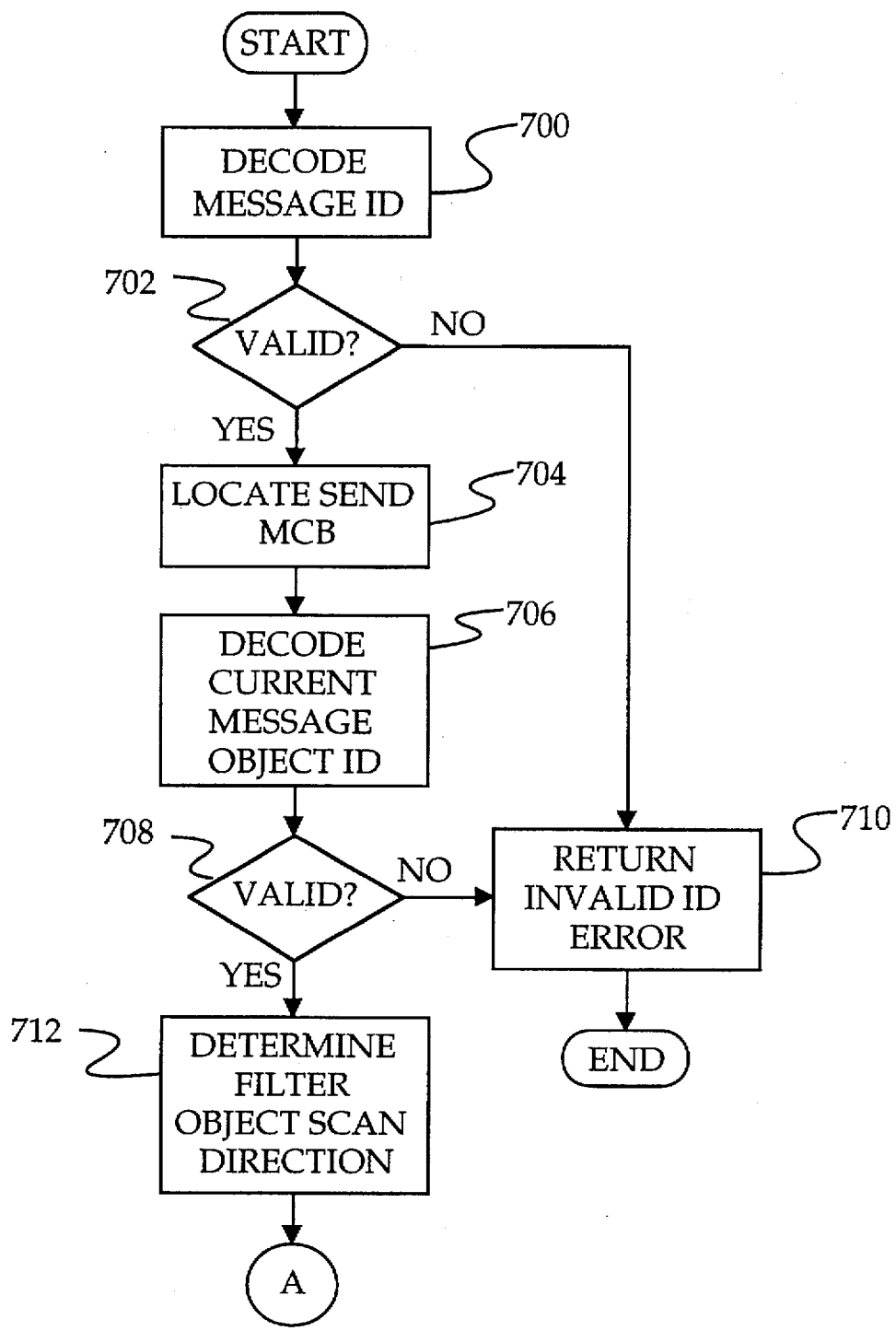
FIGS. 16A, 16B, and 16C are a flowchart of a preferred method for performing continue message operations.
Figure 16B:
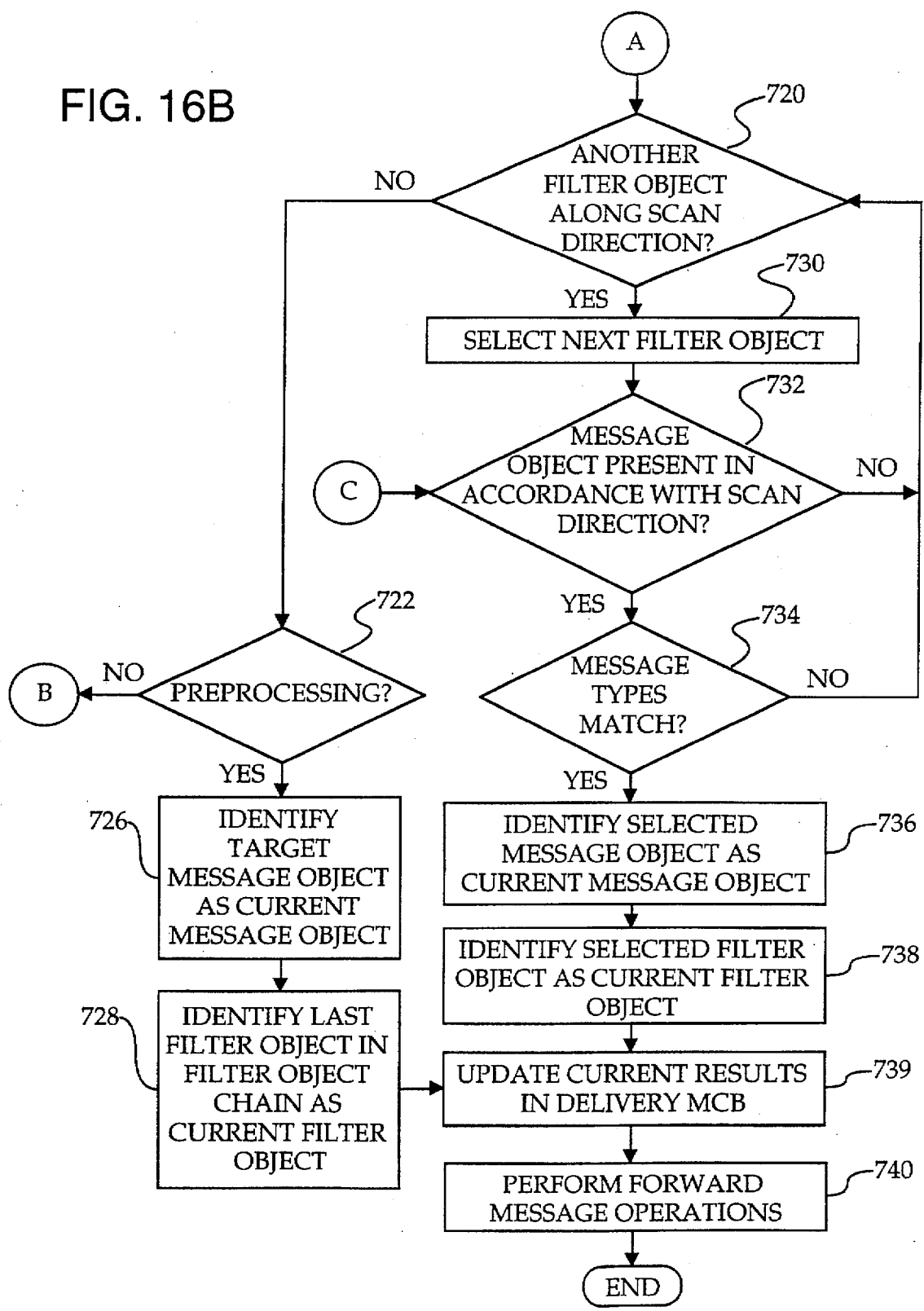
Figure 16C:
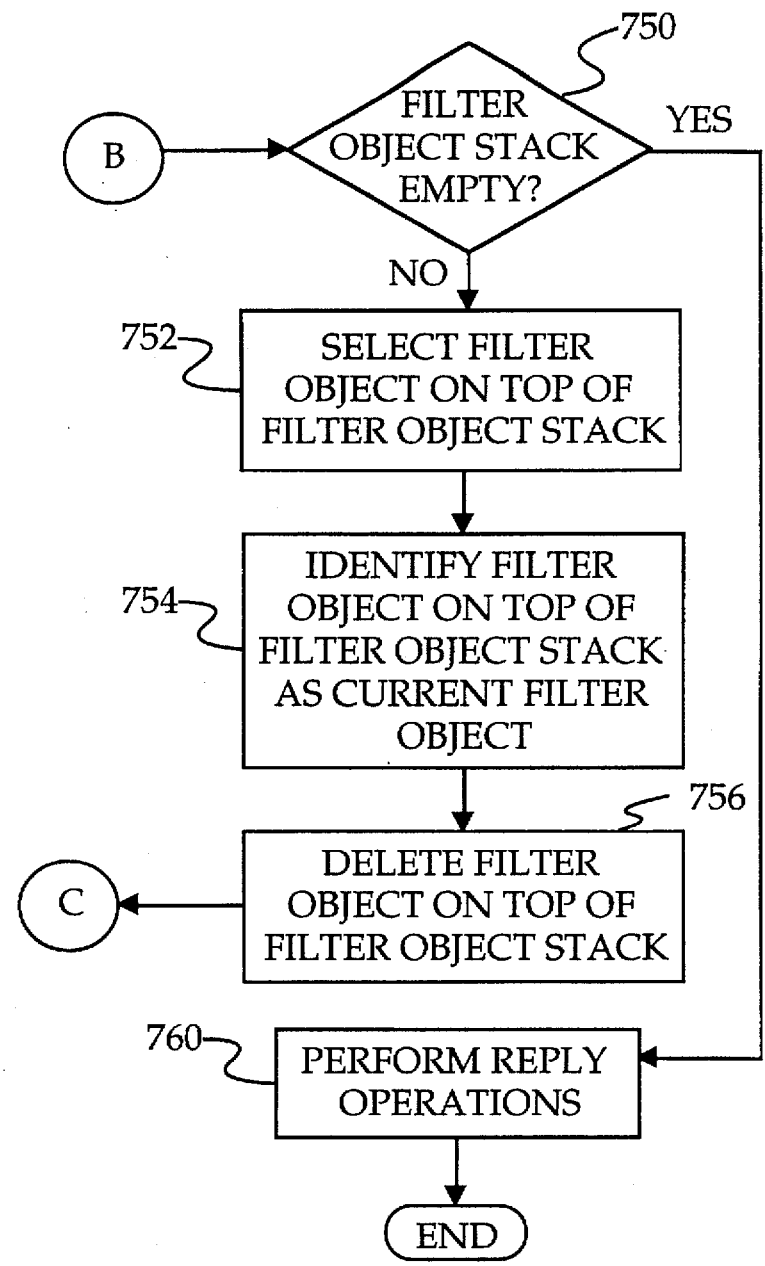

Referring now to FIGS. 16A, 16B and 16C, a flowchart of a preferred method for performing continue message operations (step 136 of FIG. 10B and step 1018 of FIG. 19A) is shown. The preferred method begins in step 700 with the message transaction unit 44 decoding the message ID specified in the continue message request. Next, the message transaction unit 44 determines whether the message ID is valid in step 702. If the message ID is not valid, the message transaction unit 44 returns an invalid ID error in step 710, after which the preferred method ends. If the message ID is valid, the message transaction unit 44 next locates the corresponding send MCB in step 704, after which the message transaction unit decodes the current message object ID specified in the third data field of the send MCB in step 706. Following step 706, the message transaction unit 44 determines whether the current message object ID is valid in step 708. If not, the message transaction unit 44 returns an invalid ID error in step 710, after which the preferred method ends. If the current message object ID is valid, the message transaction unit 44 determines the filter object chain scan direction in step 712. In determining the filter object chain scan direction, the message transaction unit 44 determines whether the current message ID stored in the send MCB matches the preprocessor message object ID stored in the current filter object 56. If the current message ID stored in the send MCB matches the preprocessor message object ID stored in the current filter object 56, the filter object chain scan direction is forward. Otherwise, the filter object chain scan direction is backward. If the filter object chain scan direction is forward, the message is to be routed either to a preprocessor message object 52 or to the target message object 51. If the filter object chain scan direction is backward, the message is to be routed to a postprocessor message object 53.

After step 712, the message transaction unit 44 determines whether the current filter object 56 as given by the second data field in the send MCB references another filter object 56 in accordance with the filter object chain scan direction in step 720. If another filter object 56 is referenced, the message transaction unit 44 selects the next filter object 56 referenced along the filter object chain scan direction in step 732. Next, the message transaction unit 44 determines in step 732 whether the selected filter object 56 has an associated preprocessor message object 52 in the event that the filter object chain scan direction is forward, or whether the selected filter object 56 has an associated postprocessor message object 53 in the event that the filter object chain scan direction is backward. That is, the message transaction unit 44 determines whether the selected filter object 56 references a message object 58 in accordance with the filter object chain scan direction. If the selected filter object 56 does not reference a message object 58 in accordance with the filter object chain scan direction, the preferred method returns to step 720. If the selected filter object 56 references a message object 58 in accordance with the filter object chain scan direction, the message transaction unit 44 determines whether the message type specified in the send MCB matches a message type in the selected filter object's message type list. If not, the preferred method returns to step 720. If the message type specified in the send MCB matches a message type in the selected filter object's message type list, the message transaction unit 44 identifies the message object referenced in the selected filter object 56 and in accordance with the filter object chain scan direction as the current message object in step 736. After step 736, the message transaction unit 44 identifies the selected filter object 56 as the current filter object in step 738. Following step 738, the message transaction unit 44 updates the current results in the delivery MCB 80 according to the current results specified in the continue message request in step 739. Next, the message transaction unit 44 performs forward message operations in step 740, after which the preferred method ends.

If the message transaction unit 44 determines in step 720 that the current filter object 56 does not reference another filter object 56 in accordance with the filter object chain scan direction, the message transaction unit 44 examines the filter object chain scan direction to determine if the most recent operations performed upon the message referenced by the send MCB had been associated with preprocessor message object 52 in step 722. If so, the message transaction unit 44 identifies the target message object 51 as the current message object 58 in step 726, after which the message transaction unit 44 identifies the last filter object 56 in the target message object's filter object chain 57 as the current filter object 56 in step 728. Following step 728, the preferred method proceeds to step 740.

If the message transaction unit 44 determines in step 722 that the filter object chain scan direction is backward, indicating that the most recent operations performed upon the message referenced by the send MCB had been associated with a postprocessor message object 53, the message transaction unit 44 next determines in step 750 whether the filter object stack in the send MCB is empty. If the filter object stack is not empty, the message transaction unit 44 selects the top entry in the filter object stack in step 752, and then identifies the corresponding filter object 56 as the current filter object in step 754. Next, the message transaction unit 44 deletes the top entry in the filter object stack in step 756. After step 756, the preferred method proceeds to step 732.

If the message transaction unit 44 determines in step 750 that the filter object stack is empty, the message transaction unit 44 next performs reply operations in step 750, after which the preferred method ends.

Referring now to FIGS. 17A, 17B, and 17C, a flowchart of a preferred method for performing forward message operations (step 140 of FIG. 10B, step 516 of FIG. 14, and step 740 of FIG. 16B) is shown. The preferred method begins in step 800 with the message transaction unit 44 decoding the message ID specified in the forward message request. Next, the message transaction unit 44 determines in step 802 whether the message ID specified in the forward message request is valid. If the message ID is not valid, the message transaction unit 44 returns an invalid ID error in step 804, after which the preferred method ends. If the message ID is valid, the message transaction unit 44 synchronizes with message object locking operations in step 806. Next, the message transaction unit 44 locates the send MCB corresponding to the message ID in step 808. The message transaction unit 44 then determines whether the send MCB is referenced in the current port object's pending reply message list in step 810. If so, the message transaction unit 44 removes the reference to the send MCB from the current port object's pending reply message list in step 811. After step 811, or after step 810, the message transaction unit 44 determines in step 812 whether the send MCB is a synchronous send MCB 60. If the send MCB is not a synchronous send MCB 60, the message transaction unit 44 determines in step 814 whether the forward message request indicates a port object 54 different from the current port object 54. If so, the message transaction unit 44 allocates a new asynchronous send MCB 62 on the new port object 54 in step 816. The message transaction unit 44 then copies the data fields from the old asynchronous send MCB 62 into the new asynchronous send MCB 62 in step 818.

After step 818, after step 814, or after step 812, the message transaction unit 44 determines whether the forward message request indicates a new target message object 51 in step 822. If so, the message transaction unit 44 determines in step 824 if the new target message object ID is valid in step 824. If the new target message object ID is not valid, the message transaction unit 44 returns an invalid ID error in step 826, after which the preferred method ends. If the new target message object ID is valid, the message transaction unit 44 updates the filter object stack in either the synchronous send MCB 60 or the new asynchronous send MCB 62 in step 828. In step 828, the message transaction unit 44 pushes in reverse order a reference to each filter object 56 in the original target message object's filter object chain 57 in the filter object stack of either the synchronous send MCB 60 or the new asynchronous send MCB 62. That is, references to filter objects 56 in the filter object chain 57 associated with the original target message object 51 are pushed onto the filter object stack beginning with the last filter object 56 in the filter object chain 57 to the first filter object 56 in the filter object chain 57. After step 828, the message transaction unit 44 identifies the new target message object 51 as the current message object in step 830.

Following step 830, or after step 822, the message transaction unit 44 determines whether a new asynchronous send MCB 62 had been allocated as a result of step 816. If so, the message transaction unit 44 deallocates the old asynchronous send MCB 62 on the old port object 54 in step 834. After step 834, or after step 832, the message transaction unit 44 updates the data fields in either the synchronous send MCB 60 or the new asynchronous send MCB 62 in step 836 by identifying the port object 54 associated with the current message object 58 as the current port object 54. The message transaction unit 44 next examines preprocessor message objects 52 in step 838, after which the message transaction unit 44 performs low-level send operations in step 840. After step 840, the preferred method ends.

Figure 18A:
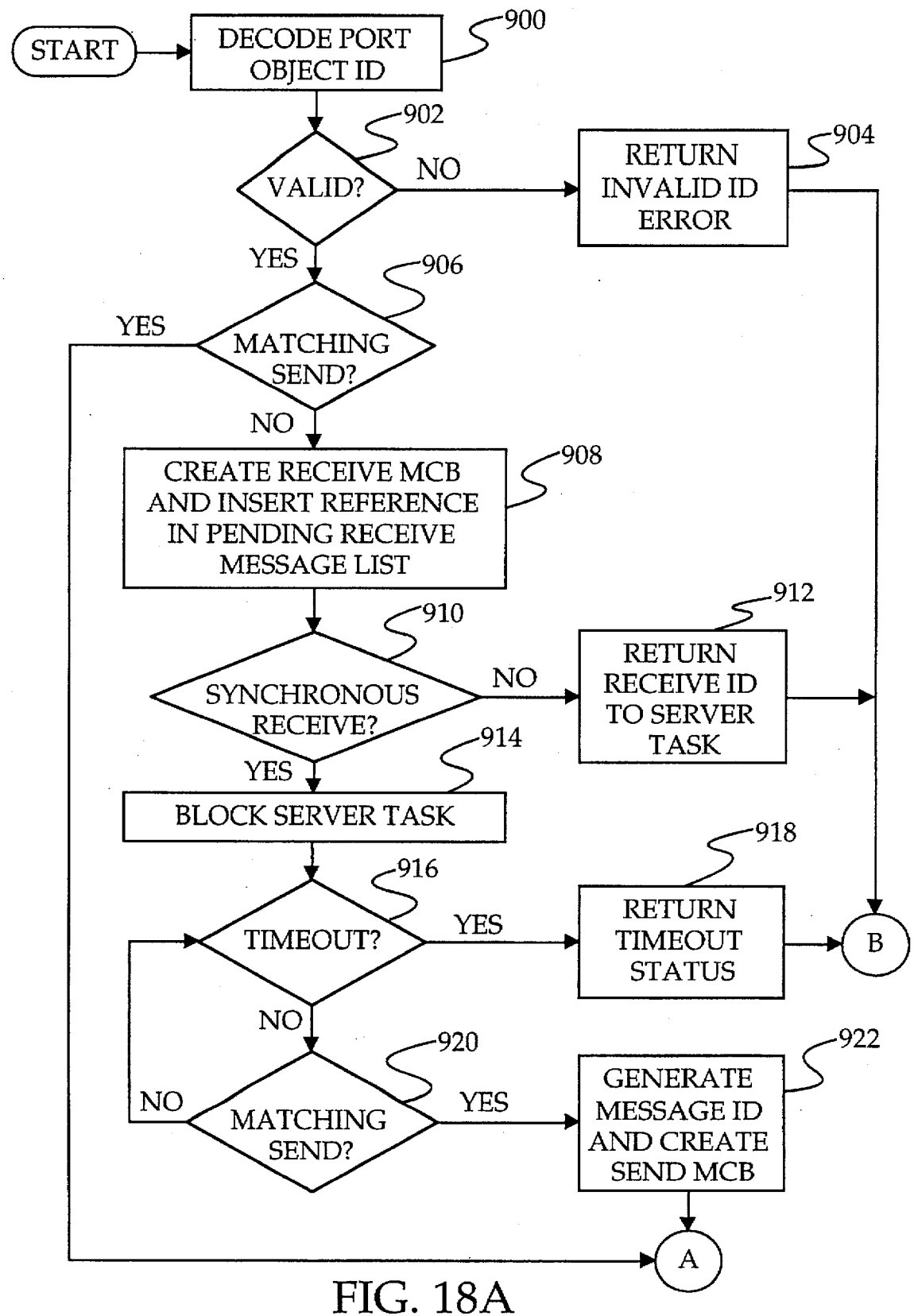
FIGS. 18A and 18B are a flowchart of a preferred method for performing receive message operations.
Figure 18B:
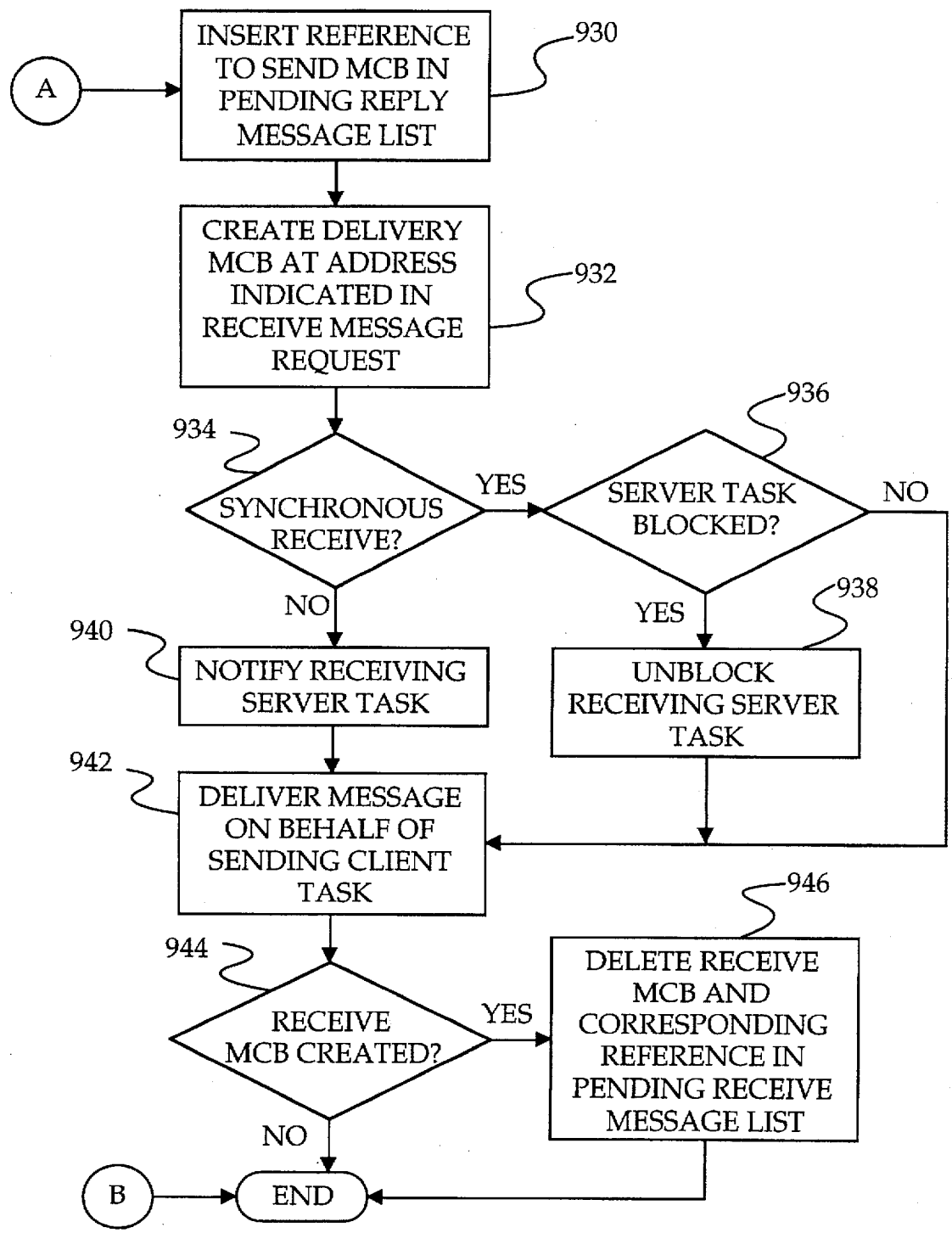

Referring now to FIG. 18A and 18B, a flowchart of a preferred method for performing receive message operations (steps 144 and 158 of FIGS. 10B and 10C, respectively) is shown. The preferred method begins in step 900 with the message transaction unit 44 decoding the port object ID specified in the receive message request. Next, the message transaction unit 44 determines whether the port object ID is valid in step 902. If the port object ID is not valid, the message transaction unit 44 returns an invalid ID error to the server task 34 that issued the receive message request in step 904, after which the preferred method ends. If the port object ID is valid, the message transaction unit 44 next determines whether a matching send MCB is present in the port object's pending send message list in step 906. If a matching send MCB is not present, the message transaction unit 44 creates a receive MCB according to the type of receive message request issued, and inserts a reference to the receive MCB in the pending receive message request list in step 908. Following step 908, the message transaction unit 44 determines whether the receive message request is synchronous in step 910. If not, the message transaction unit 44 returns the receive ID to the server task 34 that issued the asynchronous receive message request in step 912, after which preferred method ends. If the receive message request is synchronous, the message transaction unit blocks the server task 34 that issued the receive message request in step 914. Next, in step 916, the message transaction unit 44 determines whether the maximum time interval specified in the receive MCB has been exceeded. If so, the message transaction unit 44 returns a timeout status to the server task 34 in step 918, after which the preferred method ends. If the maximum time interval has not been exceeded, the message transaction unit next determines whether a matching send message request has been issued in step 920. If not, the preferred method returns to step 916. If a matching send message request has been issued, the message transaction unit 44 generates a unique message ID and creates a corresponding send MCB in step 922.

Following step 922, or following step 906 if a matching send MCB is present, the message transaction unit 44 inserts a reference to the send MCB in the port object's pending reply message list in step 930. The message transaction unit 44 then creates a delivery MCB 80 at the address specified in the receive message request or in the receive MCB in step 932. After step 932, the message transaction unit 44 determines whether the receive message request is a synchronous receive message request in step 934. If the receive message request is synchronous, the message transaction unit 44 determines whether the server task 34 that issued the receive message request is blocked in step 936. If so, the message transaction unit 44 unblocks the server task 34 in step 938.

If the message transaction unit 44 determines in step 934 that the receive message request is an asynchronous receive message request rather than a synchronous receive message request, the message transaction unit 44 notifies the server task 34 that issued the asynchronous receive message request in step 940. Following step 940, step 938, or step 936 if step 938 is not performed, the message transaction unit 44 delivers the message specified in the send MCB to the message buffer specified in the receive message request in step 942. After step 942, the message transaction unit 44 determines whether a receive MCB corresponding to the receive message request had been created in step 944. If so, the message transaction unit 44 deletes the receive MCB and its corresponding reference in the pending receive message list in step 946. After step 946, or after step 944 if step 946 is not performed, the preferred method ends.

Figure 19A:
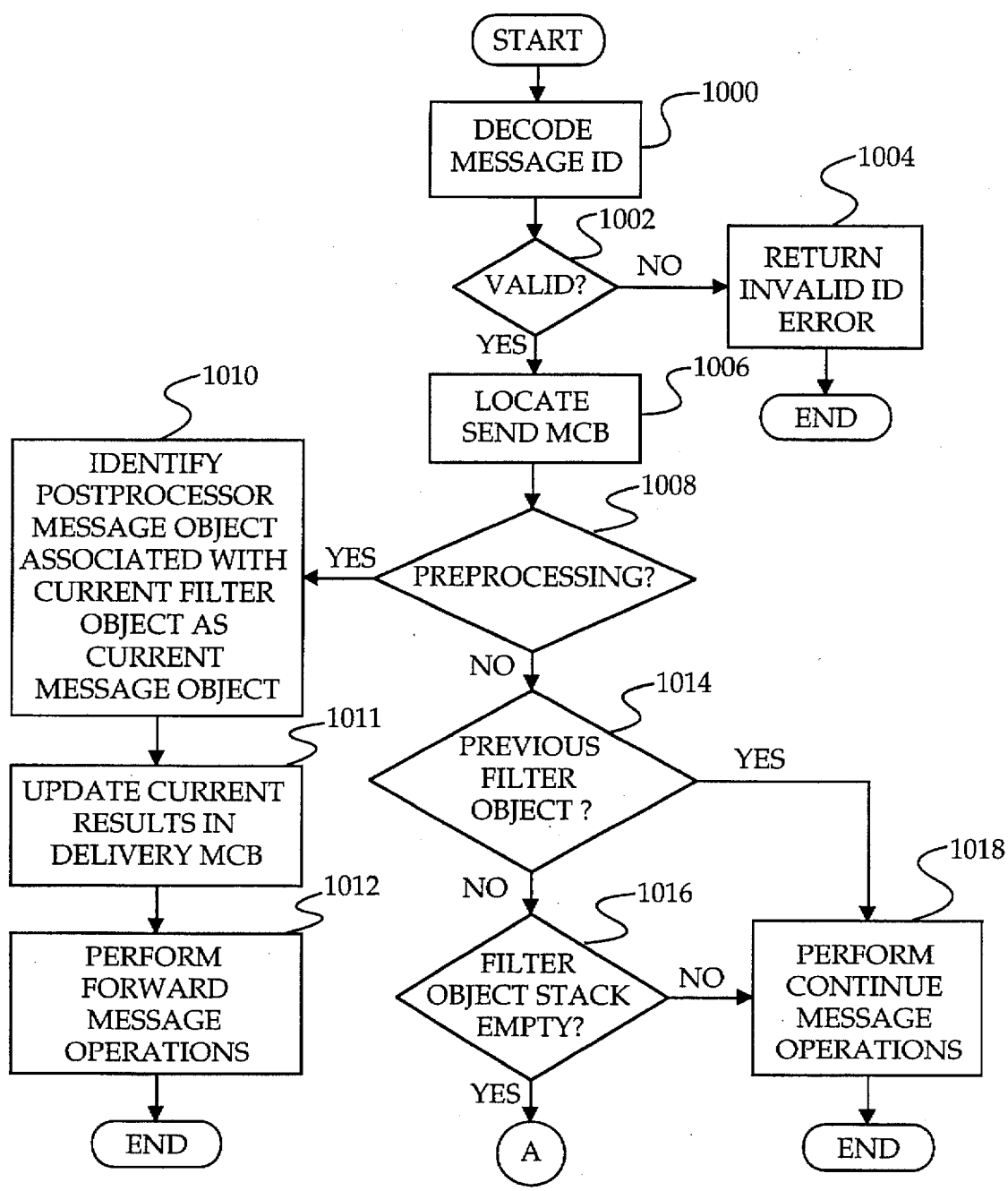
FIG. 19A and 19B are a flowchart of a preferred reply method.
Figure 19B:
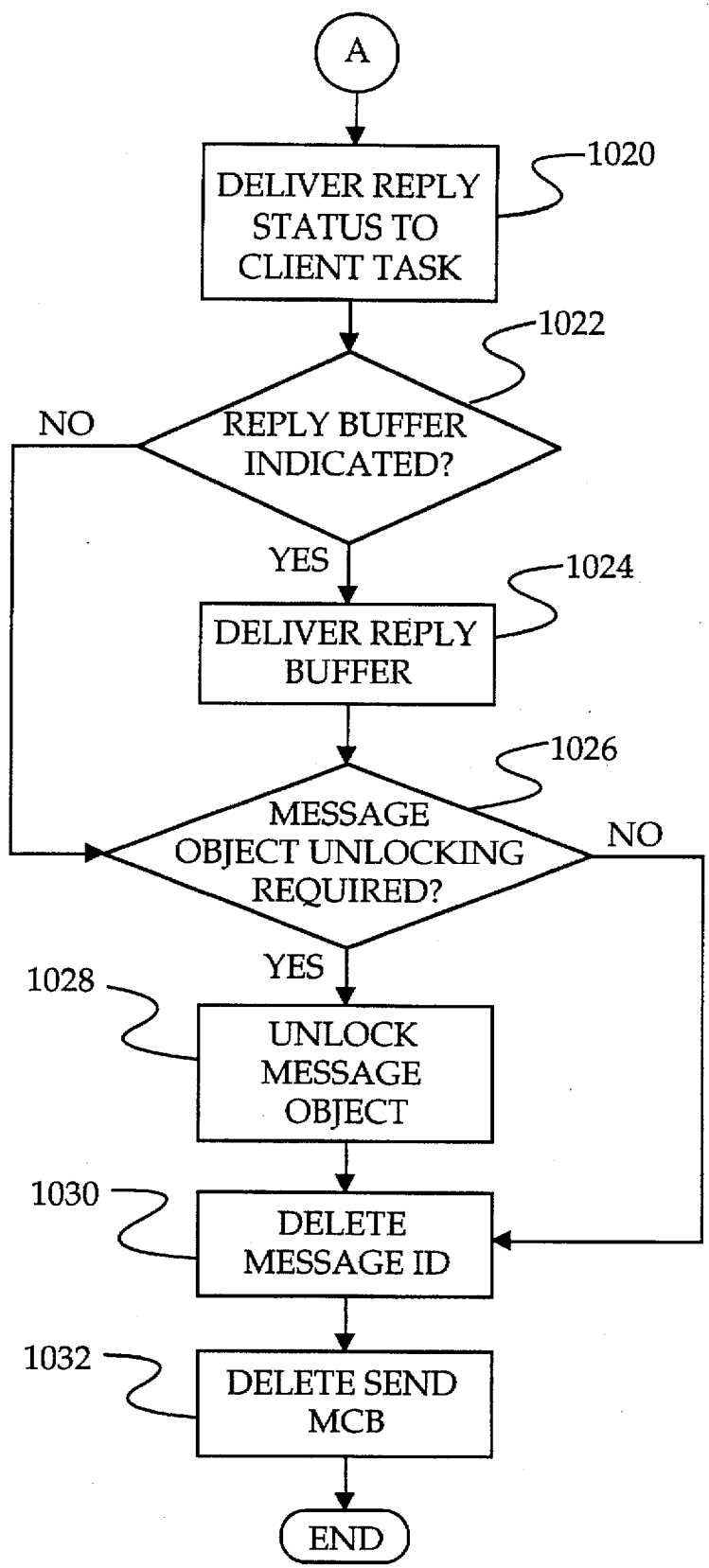

Referring now to FIGS. 19A and 19B, a flowchart of a preferred reply method is shown. The preferred method begins in step 1000 with the message transaction unit 44 decoding the message ID. Next, the message transaction unit 44 determines in step 1002 whether the message ID is valid. If the message ID is not valid, the message transaction unit 44 returns an invalid ID error in step 1004, after which the preferred method ends. If the message ID is valid, the message transaction unit 44 locates the corresponding send MCB in step 1006. The message transaction unit 44 then determines whether the most-recent operation performed upon the message is associated with a preprocessor message object 52 in step 1008. In step 1008, the message transaction unit 44 determines whether the current message object ID is identical to the preprocessor message object ID stored within the current filter object 56. If the most-recent operation performed upon the message is associated with a preprocessor message object 52, the message transaction unit 44 identifies the postprocessor message object 53 associated with the current filter object 56 as the current message object 58 in step 1010. After step 1010, the message transaction unit 44 updates the current results in the delivery MCB 80 according to the current results specified in the reply in step 1011. Next, the message transaction unit 44 performs forward message operations in step 1012, after which the preferred method ends.

When the message transaction unit 44 determines in step 1008 that the current message object ID is identical to the preprocessor message object ID stored within the current filter object 56, the message transaction unit 44 performs steps 1010 through 1012 to carry out the skip-ahead operation described above. That is, if a server task 34 issues a reply while performing a preprocessing service associated with a preprocessor message object 52, the message is routed directly to the postprocessor message object 53 associated with the preprocessor message object 52 without examining additional filter objects 56 in view of additional preprocessing, and without delivering the message to the target message object 51. The performance of any additional preprocessing services and the performance of the service associated with the target message object 51 are therefore skipped via the skip-ahead operation.

If in step 1008 the message transaction unit 44 determines that the most-recent operation performed upon the message is not associated with a preprocessor message object 52, the message transaction unit 44 determines whether the current filter object 56 references a previous filter object 56 in step 1014. If so, the message transaction unit 44 performs continue message operations in step 1018, after which the preferred method ends. If the message transaction unit 44 determines in step 1014 that the current filter object 56 does not reference a previous filter object 56, the message transaction unit 44 determines whether the filter object stack in the send MCB is empty. If the filter object stack is not empty, the preferred method proceeds to step 1018. If the filter object stack is empty, the message transaction unit 44 next delivers the reply status to the client task 32 indicated in the send MCB in step 1020. The message transaction unit 44 then determines in step 1022 whether a reply buffer was indicated in the reply. If so, the message transaction unit 44 delivers a copy of the contents of the reply buffer to the client task 32 in step 1024. After step 1024, or after step 1022 if no reply buffer is indicated in the reply, the message transaction unit 44 determines in step 1026 whether the current message object 58 is to be unlocked upon completion of the message transaction. If so, the message transaction unit 44 issues a corresponding unlock request to the locking unit 46 in step 1028. After step 1026 or after step 1028, the message transaction unit 44 deletes the message ID representing the message transaction in step 1030. Finally, the message transaction unit 44 deletes the send MCB in step 1032, after which the preferred method ends.

Figure 20:
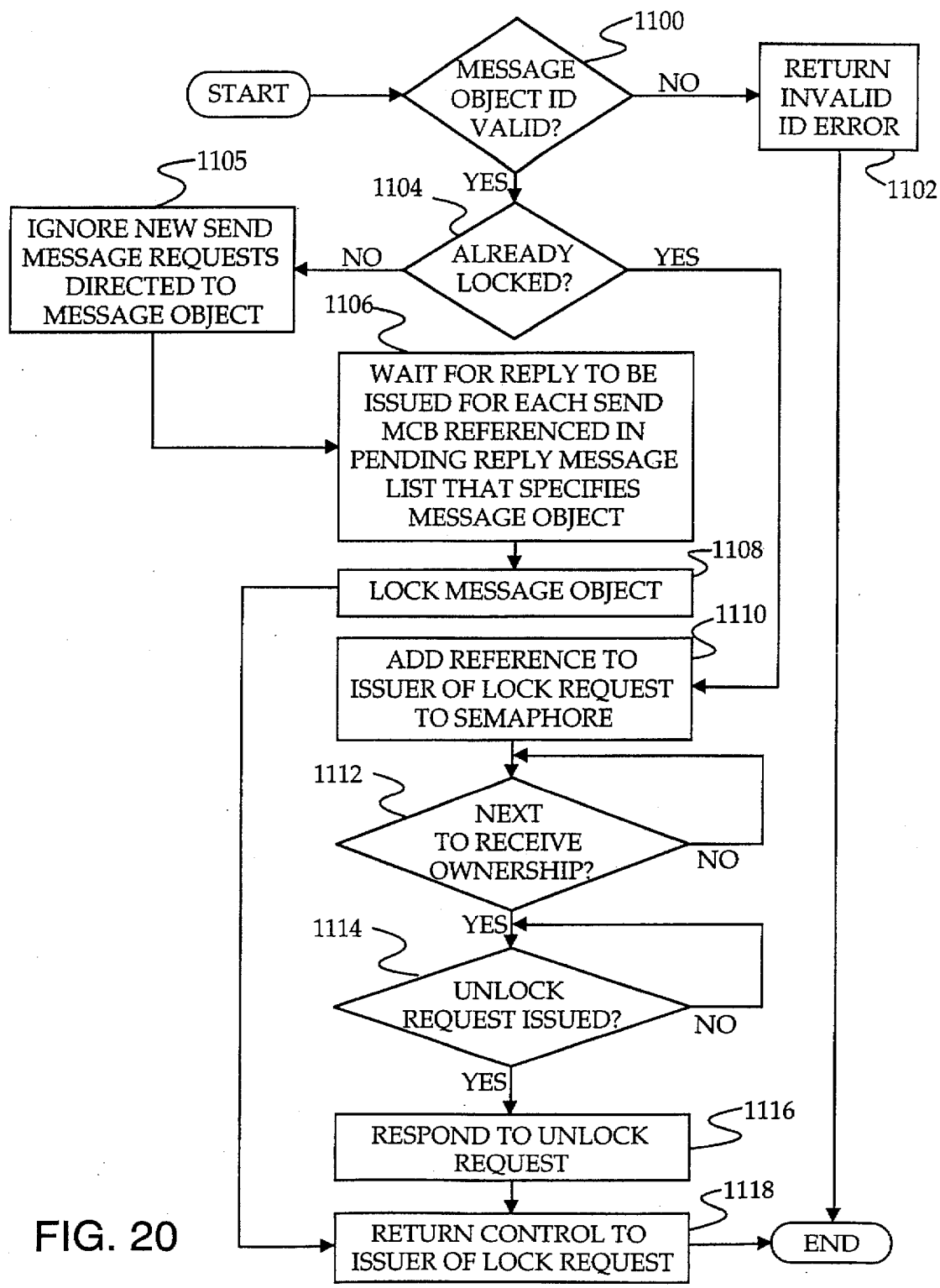
FIG. 20 is a flowchart of a preferred method for performing locking operations.

Referring now to FIG. 20, a flowchart of a preferred method for performing locking operations is shown. In the present invention, locking operations are performed in the same manner as in U.S. patent application Ser. No. 08/220,043. The preferred method begins in step 1100 with the locking unit 46 determining whether the message object ID specified in the lock request is valid. If the message object ID is not valid, the locking unit 46 returns an invalid ID error to the issuer of the lock request in step 1102, after which the preferred method ends. If the message object ID is valid, the locking unit 46 next determines in step 1104 whether the message object 58 is already locked by inspecting the list of locked message objects within the port object 54 with which the message object 52 is associated. In the preferred embodiment of the present invention, each element in the list of locked message objects is a lock structure that specifies a message object ID and a semaphore. If the message object 58 is not locked, the locking unit 46 ignores new send message requests issued by client tasks 32 in step 1105, and then waits for a reply to be issued for each send MCB referenced in the associated port object's pending reply message list that specifies the message object 58 in step 1106. Preferably, the locking unit 46 performs step 1106 by first counting the number of send message control blocks referenced in the pending reply message list that specify the message object 58, after which the locking unit 46 waits for each of the references counted to be removed from the pending reply message list. After step 1106, the locking unit 46 locks the message object 58 by inserting a new lock structure containing the corresponding message object ID into the list of locked message objects. Next, the locking unit 46 returns control to the issuer of the lock request in step 1118, after which the preferred method ends.

If the locking unit 46 determines in step 1104 that the message object 58 is already locked, the locking unit 46 next adds a reference to the lock request issuer to the corresponding lock structure semaphore in the list of locked message objects in step 1110. Preferably, the semaphore provides a FIFO-ordered lock wait list that indicates the client task ID or the server task ID of each task that is waiting to lock the message object 58. After step 1110, the locking unit 46 determines in step 1112 whether the issuer of the currently-considered lock request is next to receive ownership of the message object's lock. In the preferred method, the locking unit 46 performs step 1112 by determining whether the ID of the issuer of the currently-considered lock request is at the front of the lock wait list. If the issuer of the currently-considered lock request is not next to receive ownership of the message object's lock, the preferred method remains at step 1112.

Once the issuer of the currently-considered lock request is next to receive ownership of the message object's lock, the locking unit 46 determines whether an unlocking request has been issued in step 1114. If no unlocking request has been issued, the preferred method remains at step 1114. After an unlocking request has been issued, the locking unit 46 responds to the unlock request by performing unlocking operations in step 1116. Following step 1116, the preferred method returns control to the issuer of the currently-considered lock request in step 1118, after which the preferred method ends.

Figure 21:
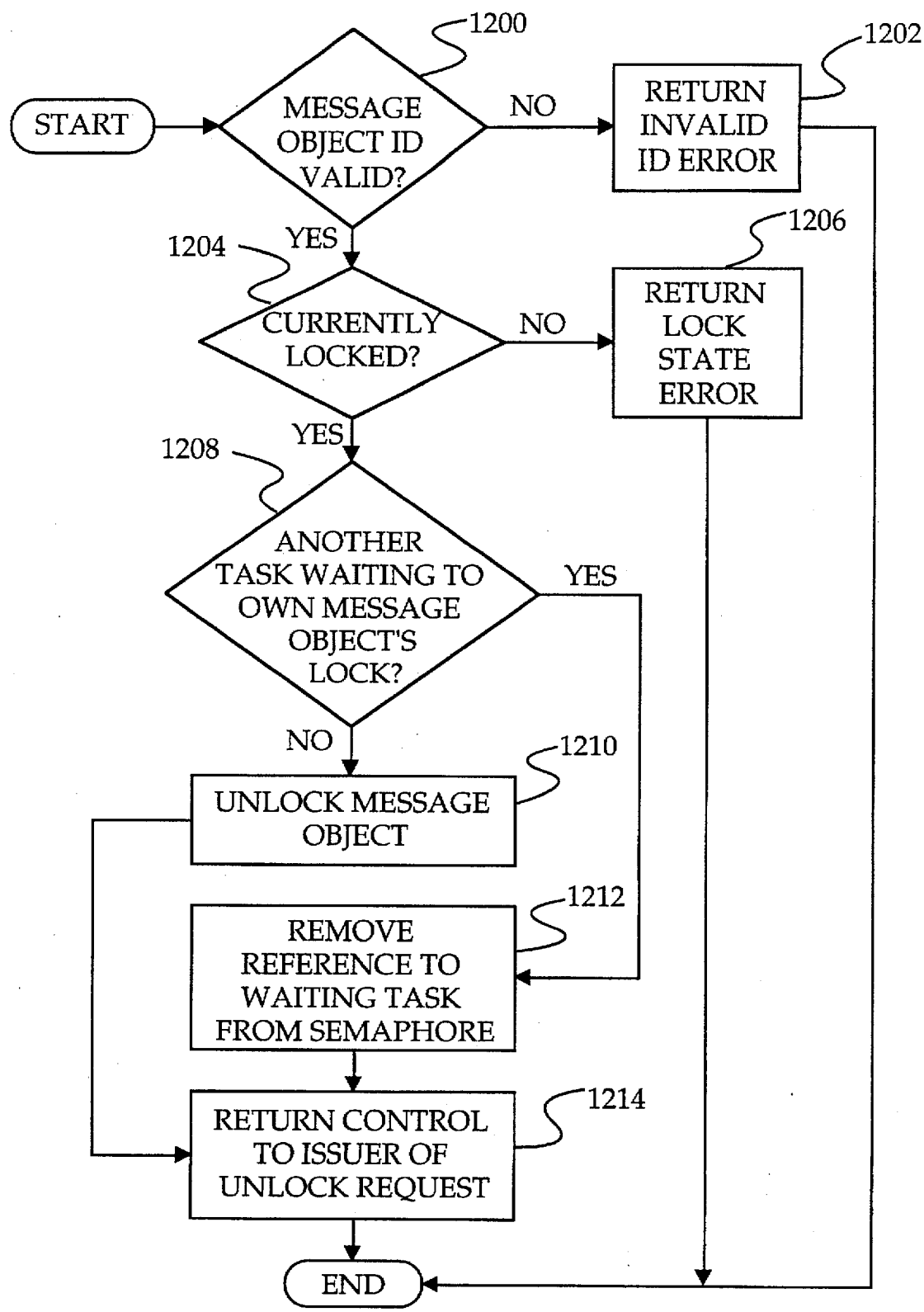
FIG. 21 is a flowchart of a preferred method for performing unlocking operations.

Referring now to FIG. 21, a flowchart of a preferred method for performing unlocking operations is shown. In the present invention, unlocking operations are performed in the same manner as in U.S. patent application Ser. No. 08/220,043. The preferred method begins in step 1200 with the locking unit 46 determining whether the message object ID of the message object 52 indicated in the unlock request is valid. If the message object ID is not valid, the locking unit 46 returns an invalid ID error to the issuer of the unlocking request in step 1202, after which the preferred method ends. If the message object ID is found to be valid in step 1200, the locking unit 46 next determines whether the message object 52 is currently locked in step 1204. Preferably, the locking unit 46 determines whether the message object 52 is currently locked by inspecting the associated port object's list of locked message objects. If the message object 52 is not currently locked, the locking unit 46 returns a lock state error to the issuer of the unlocking request in step 1206, after which the preferred method ends.

If the message object 52 is currently locked, the locking unit 46 next determines whether another task is waiting to assume ownership of the message object's lock in step 1208. The locking unit 46 preferably performs step 1208 by inspecting the semaphore associated with the message object 52. If no other task is waiting to assume ownership, the locking unit 46 removes the corresponding lock structure from the corresponding port object's list of locked message objects in step 1210, thereby unlocking the message object 52. After step 1210, the locking unit 46 returns control to the issuer of the unlock request in step 1214, after which the preferred method ends. If anther task is waiting to assume ownership of the message object's lock in step 1208, the locking unit 46 removes the reference to the client task 32 or server task 34 at the front of the semaphore's lock wait list in step 1212. Following step 1212, the preferred method proceeds to step 1214.

While the present invention has been described with reference to a preferred embodiments, those skilled in the art will recognize that various modifications may be provided. Variations upon and modifications to the preferred embodiment are provided for by the present invention, which is limited only by the following claims.

PATENT

APPENDIX A

Nu-Kernel Operating System Implementation of Message Object Filtering

Filter Content of NuKernel ERS (Material for Appendix-A)

Filtering Object Messages

A message *filter* is a pair of objects used to screen another object's messages. An object with filters is called a *target*. The set of installed filters on a target is called the *filter chain*..

Installed filters are designated by ID. The ID may be used to later remove the filter, or retrieve its installation information.

Once installed, filters are completely transparent to both clients and servers. However, servers have complete control over which of its objects may become a target.

If the target is deleted, all installed filters are automatically removed. If the target is locked, the lock applies to the entire filter chain. A target object's filter chain may be examined using an iterator service.

There is no limit to the number of filters or the number of objects which can be filtered. Filter objects can share a single port; however, a filter can only screen a single object's messages.

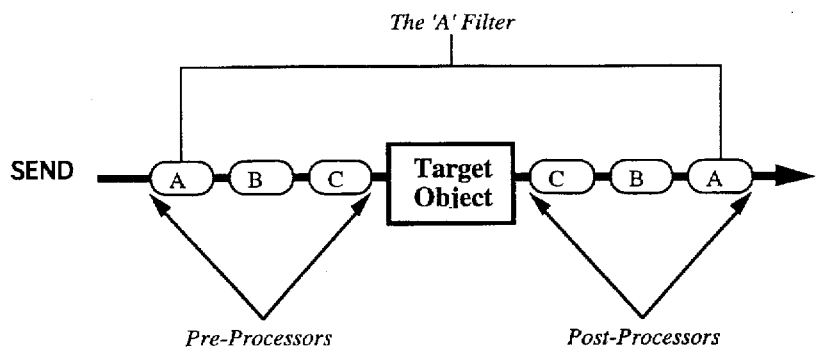

Two kinds of message objects may be used in a filter. The first kind of object screens messages *before* they arrive at the target and is called a *pre-processor*. The second kind of object screens messages as they *leave* the target and is called a *post-processor*. A filter may be composed of just a pre-processor, or just a post-processor.

A single message is passed through each filter and target object. The message is given first to the pre-processors, then the target, and finally the post-processors.

The SendMessage, SendMessageAsync, and ForwardMessage services invoke an object's pre-processors. The ReplyToMessage and CancelAsyncMessage services invoke its post-processors. The ContinueMessage service may be used by any object to pass the message to the next object in the chain.

The ForwardMessage service stacks the remaining post-processors in the current filter chain before routing the message to a new target. Once the new target and its filters have completing processing, the stack of remaining post-processors is activated.

A pre-processor object may issue a ReplyToMessage to jump over the target and begin post-processing, starting with the its *twin*. Any per-message state generated by a pre-processor object can be cleaned up by its twin.

The format of an object's message contents must be published if content modification filters are to be accommodated. Message content version numbers are recommended so that filters may track format evolution.

Filter Names

All filters are named. Filters attached to the same target must have a unique name. Filters installed on separate targets may share names.

A filter name consists of a *service* and *signature* type. The service type identifies the functionality provided by the filter. The signature type identifies the provider of the service.

Filter Name

| Service Type | Signature Type |
|---|---|

For example, an Apple supplied encryption filter might be named: 'ENCR','APPL'. The registration and allocation of signature types is to be managed by Apple Computer Inc.

Filter Ordering

Some filters require a guaranteed order of invocation with respect to other filters. Ordering requirements are specified as a set of two rules. The first rule names a filter *before* and the second rule names a filter *after* the desired location in the filter chain. The combination of a before and after rule determines the placement within the filter chain.

Filter Ordering

| | Service Type | Signature Type |
|---|---|---|
| Before Rule | | |
| After Rule | | |

Strict adjacency requirements are also supported by specifying an installation option. A filter may specify that it must be placed *directly* after or *directly* before another filter.

Two forms of wildcard name matching is supported. The first form *always* matches any service or signature type. The second form *never* matches a service of signature type. Using wildcard ordering rules allows a filter to be placed after all filters (last) or before all filters (first); for example.

A filter will not install properly if its ordering rules cannot be met, nor if the new filter will violate an existing filter's rules.

Message Filter Management

Message filters screen an object's messages. An installed filter is designated by ID.

```
typedef  KernelID FilterID;
```

Installing Filters

The following *specification* is used to install a filter.

```
typedef OSType    FilterService;
typedef OSType    FilterSignature;

enum
{
    MatchAnyFilterService       = '****',
    MatchAnyFilterSignature     = '****',
    DoNotMatchAnyFilterService  = '----',
    DoNotMatchAnyFilterSignature = '----'
};

typedef struct FilterName
{
    FilterService       theService;
    FilterSignature     theSignature;
} FilterName;

typedef struct FilterOrder
{
    FilterName      aFilterBefore;
    FilterName      aFilterAfter;
} FilterOrder;

typedef struct FilterObjectPair
{
    ObjectID        thePreProcessor;
    ObjectID        thePostProcessor;
} FilterObjectPair;

typedef struct FilterSpecification
{
    FilterName       theName;
    MessageType      theTypesToFilter;
    FilterOrder      thePlacement;
    FilterObjectPair theObjects;
} FilterSpecification;
```

Installation of filters requires that you provide a target object ID and a filter specification. Once installed, the message filter is immediately eligible to screen messages bound for the target. The result of a successful installation is a filter ID.

```
OSStatus InstallFilter (ObjectID                theTargetObject,
```

```
                        FilterOptions            theOptions,
                        FilterSpecification *    theFilter,
                        FilterID *               theFilterID);
``` theTargetObject indicates the object with which the message filter is to be associated.

theOptions indicates any special installation requirements. The following filter placement options are supported:

```
enum
{
    filterIsRightBefore  = 0x00000001,
    filterIsRightAfter   = 0x00000002
};
typedef OptionBits FilterOptions;
```

The option filterIsRightBefore causes the new filter to be installed directly adjacent and before the specified "aFilterBefore" filter.

The option filterIsRightAfter causes the new filter to be installed directly adjacent and after the specified "aFilterAfter" filter.

theFilter is the address of a filter specification.

theFilterID gets the resulting ID of the installed filter.

Removing Filters

The RemoveFilter service is used to eliminate an installed filter.

```
OSStatus RemoveFilter   (FilterID     theFilterID);
``` theFilterID specifies the filter to eliminate.

Obtaining Information About A Filter

Given the ID of a filter, you can obtain the ID of the target object and the specification used to install the filter.

```
OSStatus GetFilterInformation   (FilterID              theFilterID,
                                 ObjectID *            theTargetObject,
                                 FilterSpecification  *theFilter);
``` theFilterID is the ID of a filter about which information is to be returned.

theTargetObject is updated to indicate the ID of the filter's target object.

theFilter is updated to contain the specification used during installation.

Iterating Over Filters

You can iterate over all of the filters associated with a message object. Filters are returned in the order they appear in the chain, not in the order of installation.

```
OSStatus LookupFilters    (ObjectID          theTargetObject,
                           ItemCount         theCount,
                           ItemCount         skipCount,
                           KernelIterator *  theFilters);
``` theTargetObject specifies the ID of the message object whose filters are to be returned.

theCount indicates the maximum number of filter IDs that are to be returned.

skipCount indicates the number of filter IDs to ignore prior to returning any filter IDs.

theFilters is filled in with the IDs of the filter specified by theCount and skipCount. This KernelIterator must be large enough to store at least theCount filter IDs.

What is claimed is:

1. A message filtering method for a computer system having a processing unit and a memory wherein a message filtering unit, a client task and a set of server tasks reside, the client task comprising a sequence of program instructions that require a service, each server task comprising a sequence of program instructions capable of providing a service, and the message filtering unit comprising a sequence of program instructions that manages the transfer of messages between client tasks and server tasks, the message filtering method comprising the steps of:

creating a first target message object with the message filtering unit, the first target message object corresponding to a first type of service provided by a server task within the set of server tasks, the first target message object also corresponding to a message destination to which the client task issues a send message request for the purpose of requesting a first message processing service be performed upon a message;

creating a first filter object with the message filtering unit, the first filter object corresponding to the first target message object, the first filter object indicating whether a first message preprocessing service is associated with the first target message object;

issuing a send message request with the client task, the send message request directed to the first target message object and including a reference to a first message;

receiving the send message request with the message filtering unit;

examining the first filter object with the message filtering unit to determine whether a first message preprocessing service is required; and transferring the first message to a server task within the set of server tasks with the message filtering unit to perform the first message preprocessing service in the event that a message preprocessing service is required.

2. The method of claim 1 further comprising the steps of:

creating a second filter object with the message filtering unit, the second filter object corresponding to the first target message object, the second filter object indicating whether a second message preprocessing service is associated with the first target message object;

examining the second filter object with the message filtering unit to determine whether a next message preprocessing service is required; and transferring the first message to a server task within the set of server tasks with the message filtering unit to perform the second message preprocessing service in the event that a next message preprocessing service is required.

3. The method of claim 1, further comprising the step of transferring the first message to a server task within the set of server tasks with the message filtering unit to perform the first message processing service.

4. The method of claim 3, wherein the first filter object also indicates whether a first message postprocessing service is associated with the first target message object, the method further comprising the steps of:

examining the first filter object with the message filtering unit to determine whether a message postprocessing service is required; and transferring the first message to a server task within the set of server tasks with the message filtering unit to perform the first message postprocessing service.

5. The method of claim 1, further comprising the steps of:

creating a second target message object with the message filtering unit, the second target message object corresponding to a second type of service provided by a server task within the set of server tasks, the second target message object also corresponding to a message destination to which the client task issues a send message request for the purpose of requesting a second message processing service be performed upon a message;

determining with the message filtering unit whether the server task performing the first message preprocessing service has issued a message forward request; and transferring the first message to a server task within the set of server tasks with the message filtering unit to perform the second message processing service in the event that the server task performing the first message preprocessing service has issued a message forward request.

6. The method of claim 1, further comprising the steps of:

creating a second target message object with the message filtering unit, the second target message object corresponding to a second type of service provided by a server task within the set of server tasks, the second target message object also corresponding to a message destination to which the client task issues a send message request for the purpose of requesting a second message processing service be performed upon a message;

creating a second filter object with the message filtering unit, the second filter object corresponding to the second target message object, the second filter object indicating whether a first message preprocessing service is associated with the second target message object;

determining with the message filtering unit whether the server task performing the first message preprocessing service associated with the first target message object has issued a message forward request;

examining the second filter object with the message filtering unit to determine whether a message preprocessing service associated with the second target message object is required; and transferring the first message to a server task within the set of server tasks with the message filtering unit to perform the first message preprocessing service associated with the second target message object in the event that a message preprocessing service associated with the second target message object is required.

7. The method of claim 1, wherein the first filter object additionally indicates whether a first message postprocessing service is associated with the first target message object, the method further comprising the steps of:

determining with the message filtering unit whether the server task performing the first message preprocessing service has issued a reply signal;

transferring the first message to a server task within the set of server tasks with the message filtering unit to perform the first message postprocessing service in the event that the server task performing the first message preprocessing service has issued a reply signal.

8. A message filtering method for a computer system having a processing unit and a memory wherein a message filtering unit, a client task, and a set of server tasks reside, the client task comprising a sequence of program instructions that require a service, each server task comprising a sequence of program instructions capable of providing a service, and the message filtering unit comprising a sequence of program instructions that manages the transfer of messages between client tasks and server tasks, the message filtering method comprising the steps of:

creating a first target message object with the message filtering unit, the first target message object corresponding to a first type of service provided by a server task within the set of server tasks, the first target message object also corresponding to a message destination to which the client task issues a send message request for the purpose of requesting a first message processing service be performed upon a message;

creating a first filter object with the message filtering unit, the first filter object corresponding to the first target message object, the first filter object indicating whether a first message postprocessing service is associated with the first target message object;

issuing a send message request with the client task, the send message request directed to the first target message object and including a reference to a first message;

receiving the send message request with the message filtering unit;

transferring the first message to a server task within the set of server tasks with the message filtering unit to perform the first message processing service;

examining the first filter object to determine whether a first message postprocessing service is required; and transferring the first message to a server task within the set of server tasks with the message filtering unit to perform the first message postprocessing service.

9. The method of claim 8, further comprising the steps of:

creating a second filter object with the message filtering unit, the second filter object corresponding to the first target message object, the second filter object indicating whether a second message postprocessing service is associated with the first target message object;

examining the second filter object with the message filtering unit to determine whether a next message postprocessing service is required; and transferring the first message to a server tasks within the set of server tasks with the message filtering unit to perform a second message postprocessing service in the event that a next message postprocessing service is required.

10. A message filtering method for a computer system having a processing unit and a memory wherein a message filtering unit, a client task, and a set of server tasks reside, the client task comprising a sequence of program instructions that require a service, each server task comprising a sequence of program instructions capable of providing a service, and the message filtering unit comprising a sequence of program instructions that manages the transfer of messages between client tasks and server tasks, the message filtering method comprising the steps of:

creating a target message object with the message filtering unit, the target message object corresponding to a type of service provided by a server task within the set of server tasks, the target message object also corresponding to a message destination to which the client task issues a send message request for the purpose of requesting a message processing service be performed upon a message;

creating a set of filter objects with the message filtering unit, each filter object within the first set of filter objects corresponding to the target message object, each filter object within the set of filter objects indicating whether a message preprocessing service and whether a message postprocessing service is associated with the target message object;

issuing a send message request with the client task, the send message request directed to the target message object and including a reference to a message;

receiving the send message request with the message filtering unit;

successively performing message preprocessing services by performing the substeps of:
examining each filter object within the set of filter objects; and
transferring the message to a server task within the set of server tasks with the message filtering unit, for each filter object within the set of filter objects that indicates that a message preprocessing service is associated with the target message object;

transferring the message to a server task within the set of server tasks with the message filtering unit to perform the message processing service; and successively performing message postprocessing services by performing the substeps of:
examining each filter object within the set of filter objects; and
transferring the first message to a server task within the set of server tasks with the message filtering unit, for each filter object within the set of filter objects that indicates that a message postprocessing service is associated with the target message object.

11. The method of claim 10, wherein the substep of examining within the step of successively performing message preprocessing services occurs for a first through a last filter object within the set of filter objects, and wherein the substep of examining within the step of successively performing message postprocessing services occurs for the last through the first filter objects within the set of filter objects.

12. On a computer system having a processing unit and a memory wherein a client task and a set of server tasks reside, the client task comprising a sequence of program instructions that require a service, each server task within the set of server tasks comprising a sequence of program instructions capable of providing a service, a means for message filtering comprising:

means for creating a target message object, the target message object corresponding to a type of service provided by a server task within the set of server tasks, the target message object also corresponding to a message destination to which the client task issues a send message request for the purpose of requesting a message processing service be performed upon a message;

means for creating a set of filter objects corresponding to the target message object, each filter object within the set of filter objects indicating whether a message preprocessing service is associated with the target message object;

means for receiving a send message request issued by the client task, the send message request including a reference to a message;

means for examining a filter object within the set of filter objects to determine whether a message preprocessing service associated with the target message object is required; and means for transferring the message to a server task within the set of server tasks to perform the message preprocessing service in the event that the message preprocessing service is required.

13. The means of claim 12, further comprising a means for transferring the message to a server task within the set of server tasks to perform the message processing service.

14. The means of claim 12, wherein at least one filter object within the set of filter objects indicates whether a message postprocessing service is associated with the target message object, the means further comprising:

means for examining a filter object within the set of filter objects to determine whether a message postprocessing service associated with the target message object is required; and means for transferring the message to a server task within the set of server tasks to perform the message postprocessing service in the event that the message postprocessing service is required.

15. On a computer system having a processing unit and a memory wherein a client task and a set of server tasks reside, the client task comprising a sequence of program instructions that require a service, each server task within the set of server tasks comprising a sequence of program instructions capable of providing a service, a means for message filtering comprising:

means for creating a target message object, the target message object corresponding to a type of service provided by a server task within the set of server tasks, the target message object also corresponding to a message destination to which the client task issues a send message request for the purpose of requesting a message processing service be performed upon a message;

means for creating a set of filter objects corresponding to the target message object, each filter object within the set of filter objects indicating whether a message postprocessing service is associated with the target message object;

means for receiving a send message request issued by the client task, the send message request including a reference to a message;

means for transferring the message to a server task within the set of server tasks to perform the message processing service;

means for examining a filter object within the set of filter objects to determine whether a message postprocessing service is associated with the target message object; and means for transferring the message to a server task within the set of server tasks to perform the message postprocessing service in the event that a message postprocessing service is required.

16. A system for message filtering, for selectively routing a message from a client task to a set of server tasks to perform message preprocessing operations, the object-oriented message filtering system comprising:

a memory having an input and an output for storing data and commands, the memory including a message filtering unit for creating a target message object to which a client task issues a send message request for requesting a message processing service; creating a filter object indicating whether a message preprocessing service is associated with the target message object, receiving a send message request issued by a client task, examining the filter object to determine whether a message preprocessing service is associated with the target message object, and transferring a message to a server task to perform the message preprocessing service, the message filtering unit comprising program instructions that form a portion of a computer operating system; and a processing unit having an input and an output, for processing data and executing commands under control of program instructions stored in the memory, the input of the processing unit coupled to the output of the memory, and the output of the processing unit coupled to the input of the memory.

17. A system for message filtering, for selectively routing a message from a client task to a set of server tasks to perform message postprocessing operations, the object-oriented message filtering system comprising:

a memory having an input and an output for storing data and commands, the memory including a message filtering unit for creating a target message object to which a client task issues a send message request for requesting a message processing service, creating a filter object indicating whether a message postprocessing service is associated with the target message object, receiving a send message request issued by a client task, transferring a message to a server task to perform the message processing service, examining the filter object to determine whether a message postprocessing service is associated with the target message object, and transferring the message to a server task to perform the message postprocessing service, the message filtering unit comprising program instructions that form a portion of a computer operating system; and a processing unit having an input and an output, for processing data and executing commands under control of program instructions stored in the memory, the input of the processing unit coupled to the output of the memory, and the output of the processing unit coupled to the input of the memory.

18. A computer-readable medium storing program instructions for performing the steps of:

creating a target message object, the target message object corresponding to a type of service provided by a server task, the target message object also corresponding to a message destination to which a client task issues a send message request for the purpose of requesting a message processing service be performed upon a message;

creating a filter object, the filter object corresponding to the target message object, the filter object indicating whether a message preprocessing service is associated with the target message object;

receiving a send message request issued by a client task, the send message request including a reference to a message;

examining the filter object to determine whether a message preprocessing service is required; and transferring the message to a server task to perform the message preprocessing service.

19. A computer-readable medium storing program instructions for performing the steps of:

creating a target message object, the target message object corresponding to a type of service provided by a server task, the target message object also corresponding to a message destination to which a client task issues a send message request for the purpose of requesting a message processing service be performed upon a message;

creating a filter object, the filter object corresponding to the target message object, the filter object indicating whether a message postprocessing service is associated with the target message object;

receiving a send message request issued by a client task, the send message request including a reference to a message;

transferring the message to a server task to perform the message processing service;

examining the filter object to determine whether a message postprocessing service is required; and transferring the message to a server task to perform the message postprocessing service.

* * * * *